US010834626B2

(12) United States Patent
Youn et al.

(10) Patent No.: US 10,834,626 B2
(45) Date of Patent: Nov. 10, 2020

(54) METHOD FOR APPLYING REFLECTIVE QUALITY OF SERVICE IN WIRELESS COMMUNICATION SYSTEM, AND DEVICE THEREFOR

(71) Applicant: LG Electronics Inc., Seoul (KR)

(72) Inventors: Myungjune Youn, Seoul (KR); Hyunsook Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/064,386

(22) PCT Filed: Sep. 22, 2017

(86) PCT No.: PCT/KR2017/010476
§ 371 (c)(1),
(2) Date: Jun. 20, 2018

(87) PCT Pub. No.: WO2018/070689
PCT Pub. Date: Apr. 19, 2018

(65) Prior Publication Data
US 2020/0275302 A1 Aug. 27, 2020

Related U.S. Application Data

(60) Provisional application No. 62/489,998, filed on Apr. 25, 2017, provisional application No. 62/477,438, (Continued)

(51) Int. Cl.
H04W 28/02 (2009.01)
H04W 28/24 (2009.01)
H04W 28/06 (2009.01)

(52) U.S. Cl.
CPC ....... *H04W 28/0268* (2013.01); *H04W 28/06* (2013.01); *H04W 28/24* (2013.01)

(58) Field of Classification Search
CPC .. H04W 28/0268; H04W 28/06; H04W 28/24
See application file for complete search history.

(56) References Cited

U.S. PATENT DOCUMENTS

2009/0175279 A1 7/2009 Gao et al.
2014/0233380 A1 8/2014 Kim et al.
(Continued)

FOREIGN PATENT DOCUMENTS

KR 20090015826 2/2009
WO WO2013062363 5/2013

OTHER PUBLICATIONS

3rd Generation Partnership Project; Technical Specification Group Services and System Aspects; "Study on Architecture for Next Generation System (Release 14)," 3GPP TR 23.799 V0.5.0, dated May 2016, 191 pages, XP051123270.
(Continued)

*Primary Examiner* — Afshawn M Towfighi
(74) *Attorney, Agent, or Firm* — Fish & Richardson P.C.

(57) ABSTRACT

In an aspect of the present invention, a method for a user equipment (UE) to perform reflective quality of service (QoS) in a wireless communication system may include the steps of receiving a downlink packet from a network, wherein the downlink packet is a packet to which the application of the reflective QoS is indicated; deriving a QoS rule based on the downlink packet; applying a QoS marking of the downlink packet to an uplink packet using the QoS rule and transmitting the uplink packet to the network; and restarting a timer associated with the QoS rule when the downlink packet is received before the timer expires.

15 Claims, 19 Drawing Sheets

Related U.S. Application Data filed on Mar. 28, 2017, provisional application No. 62/474,082, filed on Mar. 21, 2017, provisional application No. 62/418,799, filed on Nov. 8, 2016, provisional application No. 62/406,423, filed on Oct. 11, 2016.

(56) References Cited

U.S. PATENT DOCUMENTS

| 2018/0234876 | A1* | 8/2018 | Jheng | H04L 67/146 |
|---|---|---|---|---|
| 2019/0028920 | A1* | 1/2019 | Pan | H04W 28/0268 |

OTHER PUBLICATIONS

Extended European Search Report in European Application No. 17860266.0, dated Mar. 16, 2020, 10 pages.

Intel (email discussion convenor), "Summary of email discussion on QoS framework," S2-164759, SA WG2 Meeting #116-BIS, Sanya, P.R. China, dated Aug. 29-Sep. 2, 2016, 16 pages, XP051143547.

ZTE, ZTE Microelectronics, "Consideration on the impact of QoS on NR UP," R2-166336, 3GPP TSG-RAN WG2 Meeting #95bis, Kaohsiung, dated Oct. 10-14, 2016, 6 pages, XP051161658.

Digital cellular telecommunications system (Phase 2+); Universal Mobile Telecommunications System (UMTS); "LTE; 3GPP system—fixed broadband access network interworking; Stage 2" 3GPP system—fixed broadband access network interworking; 3GPP TS 23.139 version 13.0.0 Release 13, Jan. 18, 2016, 92 pages.

Universal Mobile Telecommunications System (UMTS); LTE; "3GPP system—fixed broadband access network interworking; Stage 3," 3GPP TS 24.139 version 13.1.0 Release 13, Jul. 29, 2016, 23 pages.

3rd Generation Partnership Project; Technical Specification Group Core Network and Terminals; "3GPP system—fixed broadband access network interworking; Stage 3 (Release 13)," 3GPP TS 24.139 V13.1.0, Jun. 24, 2016, 19 pages.

3rd Generation Partnership Project; Technical Specification Group Services and System Aspects; "3GPP system—fixed broadband access network interworking; Stage 2 (Release 13)," 3GPP TS 23.139 V13.0.0, Dec. 15, 2015, 88 pages.

* cited by examiner (a) Control plane protocol stack (b) User plane protocol stack (a)

(b)

(a)

(b)

METHOD FOR APPLYING REFLECTIVE QUALITY OF SERVICE IN WIRELESS COMMUNICATION SYSTEM, AND DEVICE THEREFOR

CROSS-REFERENCE TO RELATED APPLICATIONS

This application is a National Stage application under 35 U.S.C. § 371 of International Application No. PCT/KR2017/010476, filed on Sep. 22, 2017, which claims the benefit of U.S. Provisional Application No. 62/489,998, filed on Apr. 25, 2017, U.S. Provisional Application No. 62/477,438, filed on Mar. 28, 2017, U.S. Provisional Application No. 62/474,082, filed on Mar. 21, 2017, U.S. Provisional Application No. 62/418,799, filed on Nov. 8, 2016, and U.S. Provisional Application No. 62/406,423, filed on Oct. 11, 2016. The disclosures of the prior applications are incorporated by reference in their entirety.

TECHNICAL FIELD

The present invention relates to a wireless communication system and, more particularly, to a method of applying/supporting reflective QoS and an apparatus performing the same.

BACKGROUND ART

A mobile communication system has been developed to provide a voice service while guaranteeing activity of a user. However, the mobile communication system extends an area up to a data service as well as a voice and at present, a short phenomenon of a resource is caused due to an explosive increase of traffic and uses require a higher-speed service, and as a result, a more developed mobile communication system is required.

Requirements of a next-generation mobile communication system largely need to support accommodation of explosive data traffic, an epochal increase of transmission rate per user, accommodation of the significantly increased number of connection devices, very low end-to-end latency, and high energy efficiency. To this end, various technologies have been researched, which include dual connectivity, massive multiple input multiple output (MIMO), in-band full duplex, non-orthogonal multiple access (NOMA), super wideband supporting, device networking, and the like.

DISCLOSURE

Technical Problem

An object of the present invention is to propose an efficient reflective QoS procedure.

Furthermore, an object of the present invention is to propose a timer operation for counting a reflective QoS application-valid time in order to efficiently operate a reflective QoS procedure.

Technical objects to be achieved by the present invention are not limited to the aforementioned objects, and those skilled in the art to which the present invention pertains may evidently understand other technological objects from the following description.

Technical Solution

In an aspect of the present invention, a method for a user equipment (UE) to perform reflective quality of service (QoS) in a wireless communication system may include the steps of receiving a downlink packet from a network, wherein the downlink packet is a packet to which the application of the reflective QoS is indicated; deriving a QoS rule based on the downlink packet; applying a QoS marking of the downlink packet to an uplink packet using the QoS rule and transmitting the uplink packet to the network; and restarting a timer associated with the QoS rule when the downlink packet is received before the timer expires.

Furthermore, the method of performing the reflective QoS may further include the step of deleting the QoS rule when the timer expires.

Furthermore, the method of performing the reflective QoS may further include the step of starting the timer when the downlink packet is received after the timer expires.

Furthermore, a value of the timer may be previously determined in the protocol data unit (PDU) session establishment procedure of the UE.

Furthermore, if the network is an access network (AN), the AN may be a network node receiving reflective QoS indication indicative of the reflective QoS application of the downlink packet and the QoS marking through an encapsulation header on an N3 reference point from a user plane function.

Furthermore, the QoS marking may correspond to an identifier of a QoS flow of the downlink packet.

Furthermore, the QoS rule may be used to determine a mapping relation between the uplink packet and the QoS flow.

Furthermore, the QoS rule may include a packet filter derived from the downlink packet, the QoS marking of the downlink packet, and a precedence value used to determine the evaluation order of the uplink packet.

Furthermore, the packet filter may be derived from a header of the downlink packet.

Furthermore, the step of applying the QoS marking of the downlink packet to the uplink packet using the QoS rule and transmitting the uplink packet to the network may include the steps of filtering an uplink packet matched with the packet filter included in the QoS rule by evaluating a plurality of uplink packets in the order of the precedence value; and applying the QoS marking included in the QoS rule to the filtered uplink packet and transmitting the filtered uplink packet to the network.

Furthermore, the step of deriving the QoS rule based on the downlink packet may include the steps of checking whether the QoS rule associated with the downlink packet is present; and deriving the QoS rule based on the downlink packet if the QoS rule associated with the downlink packet is not present and starting the timer.

Furthermore, the QoS rule derived according to the reflective QoS application may have lower priority than an explicitly signaled QoS rule.

Furthermore, the application of the reflective QoS may be deactivated through a user plane or a control plane.

Furthermore, a user equipment (UE) for performing reflective quality of service (QoS) in a wireless communication system according to another embodiment of the present invention may include a communication module configured to transmit/receive a signal; and a processor configured to control the communication module, wherein the processor may receive downlink packet from a network, the downlink packet being a packet to which the application of the reflective QoS is indicated, may derive a QoS rule based on the downlink packet, may apply a QoS marking of the downlink packet to an uplink packet using the QoS rule and transmit the uplink packet to the network, and may restart a timer associated with the QoS rule when the downlink packet is received before the timer expires.

Furthermore, the processor may delete the QoS rule when the timer expires.

Furthermore, the QoS rule may include a packet filter derived from the downlink packet, the QoS marking of the downlink packet, and a precedence value used to determine the evaluation order of the uplink packet.

Advantageous Effects

In accordance with an embodiment of the present invention, there are effects in that signaling overhead for QoS marking is reduced and a QoS procedure is simplified by applying a reflective QoS.

Furthermore, in accordance with an embodiment of the present invention, there is an effect in that a burden of a UE which may occur because a unnecessary QoS rule is consistently managed/stored can be significantly reduced because a UE deletes a reflective QoS whose timer has expired in real time by applying a reflective QoS timer.

Furthermore, in accordance with an embodiment of the present invention, there are effects in that signaling overhead is reduced and a timer operation procedure is simplified because a separate indicator for starting/restarting a timer does not need to be signaled.

Technical effects of the present invention are not limited to the technical effects described above, and those skilled in the art may understand other technical effects not mentioned herein from the following description.

DESCRIPTION OF DRAWINGS

The accompanying drawings, which are included to provide a further understanding of the invention as a part of detailed descriptions, illustrate embodiments of the invention and together with the descriptions, serve to explain the technical principles of the invention.

MODE FOR INVENTION

Figure 1:
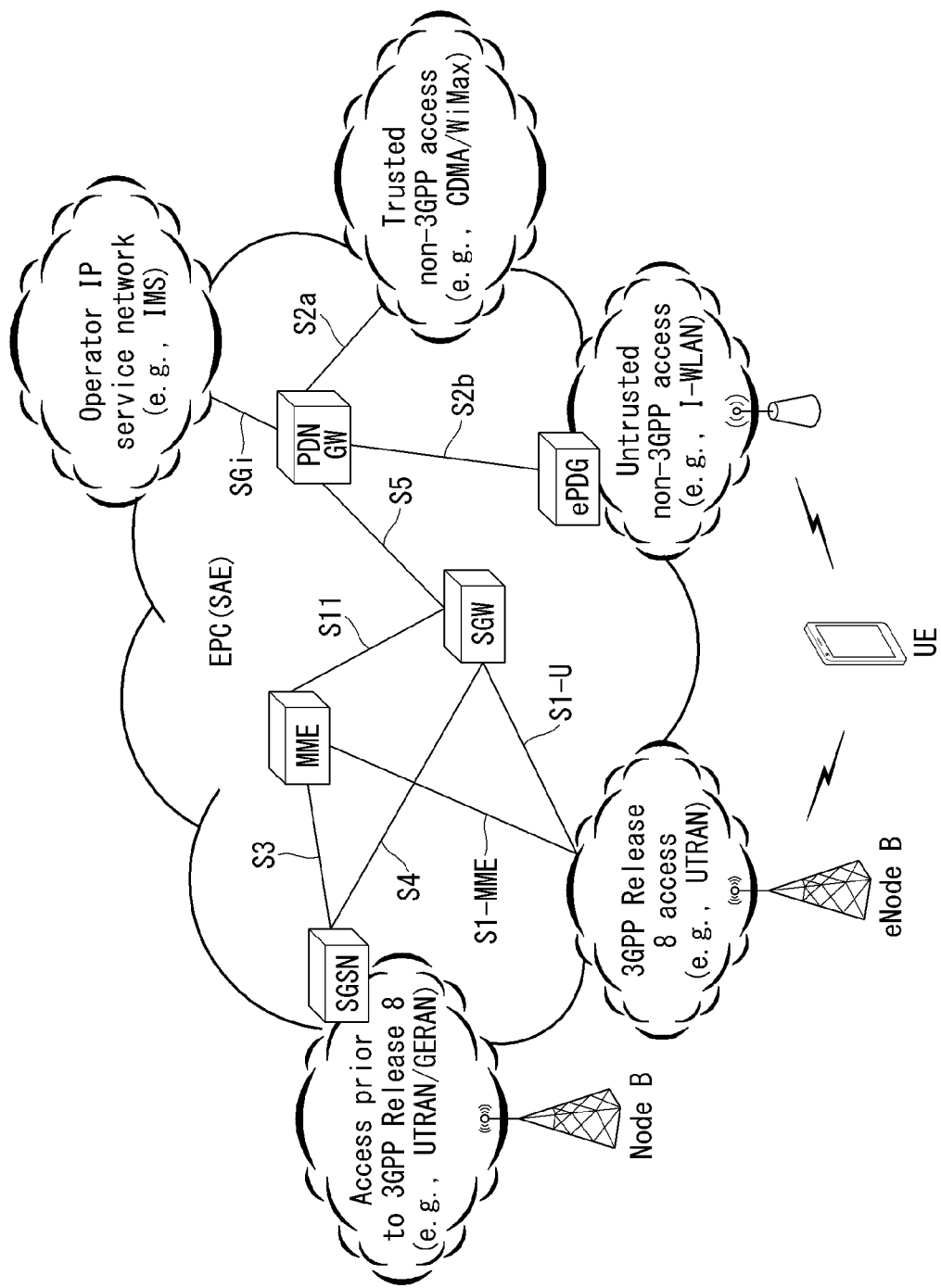
FIG. 1 illustrates an Evolved Packet System (EPS) to which the present invention can be applied.

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device or MRT apparatus): a terminal (e.g., a vending machine, meter, and so on) equipped with a communication function (e.g., communication with an MTC server through PLMN) operating through a mobile communication network and performing the MTC functions.

MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC user: an MTC user uses a service provided by an MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for a use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): an entity in 3GPP architecture for the service capability exposure that provides a means for safely exposing a service and a capability provided by 3GPP network interface.

In what follows, the present invention will be described based on the terms defined above.

Overview of System to which the Present Invention can be Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and Wimax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
| --- | --- |
| S1-MME | Reference point for the control plane protocol between E-UTRAN and MME |

TABLE 1-continued

| Reference point | Description |
| --- | --- |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

Figure 2:
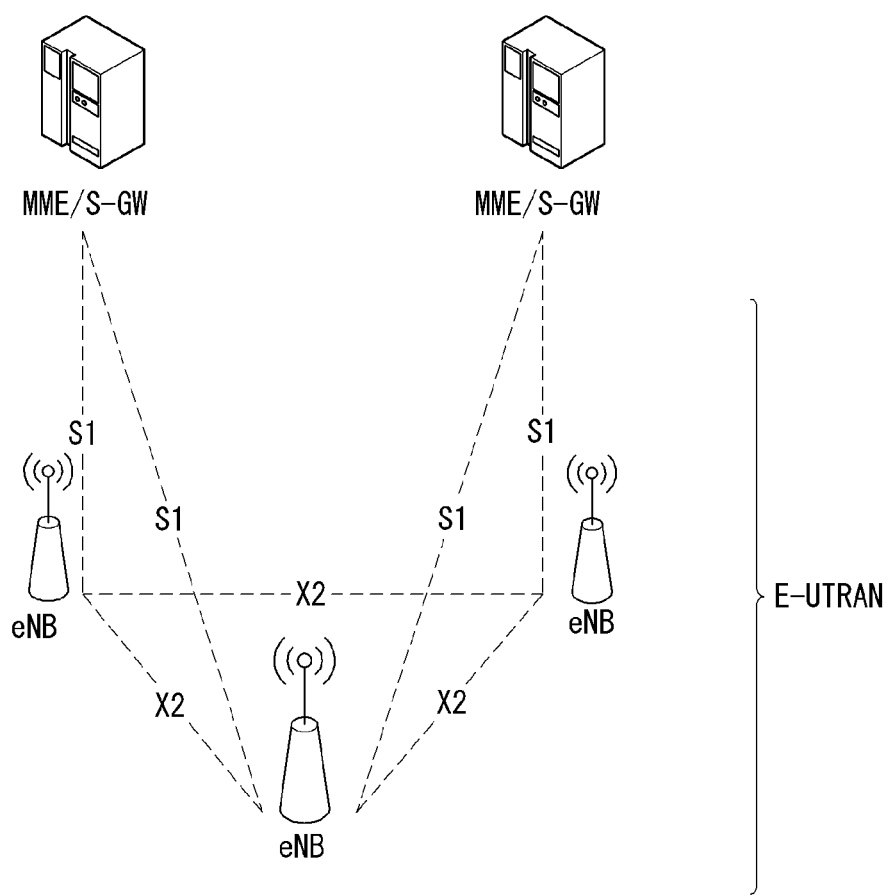
FIG. 2 illustrates one example of an Evolved Universal Terrestrial Radio Access Network (E-UTRAN) to which the present invention can be applied.

FIG. 2 illustrates one example of an Evolved Universal Terrestrial Radio Access Network (E-UTRAN) to which the present invention can be applied.

The E-UTRAN system has evolved from an existing UTRAN system and may be the 3GPP LTE/LTE-A system, for example. A communication system is disposed over a wide area to provide various communication services including voice communication through IMS and packet data (for example, VoIP (Voice over Internet Protocol)).

Referring to FIG. 2, an E-UMTS network comprises an E-UTRAN, EPC, and one or more UEs. The E-UTRAN comprises eNBs providing a UE with a control plane and user plane protocols, where the eNBs are connected to each other through X2 interface.

The X2 user plane interface (X2-U) is defined among the eNBs. The X2-U interface provides non-guaranteed delivery of the user plane Protocol Data Unit (PDU).

The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, NAS signaling transport, network sharing, MME load balancing management, and so on. The S1 interface supports many-to-many-relation between the eNB and the MME/S-GW.

An MME is capable of performing various functions such as NAS signaling security, AS (Access Stratum) security control, inter-CN (Core Network) signaling for supporting mobility among 3GPP access networks, IDLE mode UE reachability (including performing and controlling retransmission of a paging message), TAI (Tracking Area Identity) management (for IDLE and active mode UEs), PDN GW and SGW selection, MME selection for handover in which MMEs are changed, SGSN selection for handover to a 2G or 3G 3GPP access network, roaming, authentication, bearer management function including dedicated bearer establishment, and support for transmission of a PWS (Public Warning System) (including Earthquake and Tsunami Warning System (ETWS) and Commercial Mobile Alert System (CMAS)) message.

Figure 3:
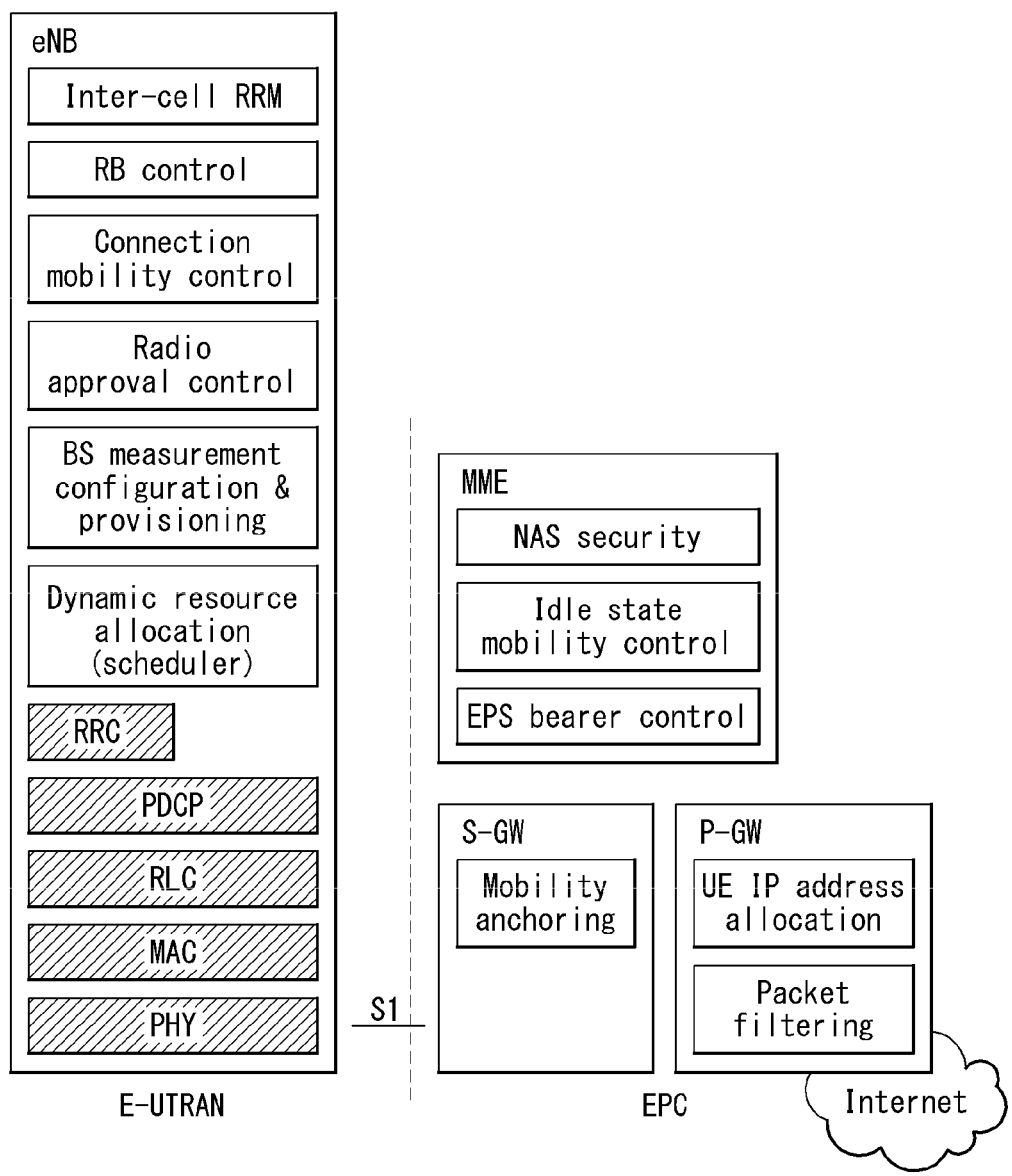
FIG. 3 illustrates structures of an E-UTRAN and an EPC in a wireless communication system to which the present invention may be applied.

FIG. 3 illustrates structures of an E-UTRAN and an EPC in a wireless communication system to which the present invention may be applied.

Referring to FIG. 3, an eNB is capable of performing functions such as selection of a gateway (for example, MME), routing to a gateway during RRC (Radio Resource Control) activation, scheduling and transmission of a BCH (Broadcast Channel), dynamic resource allocation for a UE in uplink and downlink transmission, and mobility control connection in an LTE_ACTIVE state. As described above, a gateway belonging to an EPC is capable of performing functions such as paging origination, LTE_IDLE state management, ciphering of a user plane, SAE (System Architecture Evolution) bearer control, and ciphering of NAS signaling and integrity protection.

Figure 4:
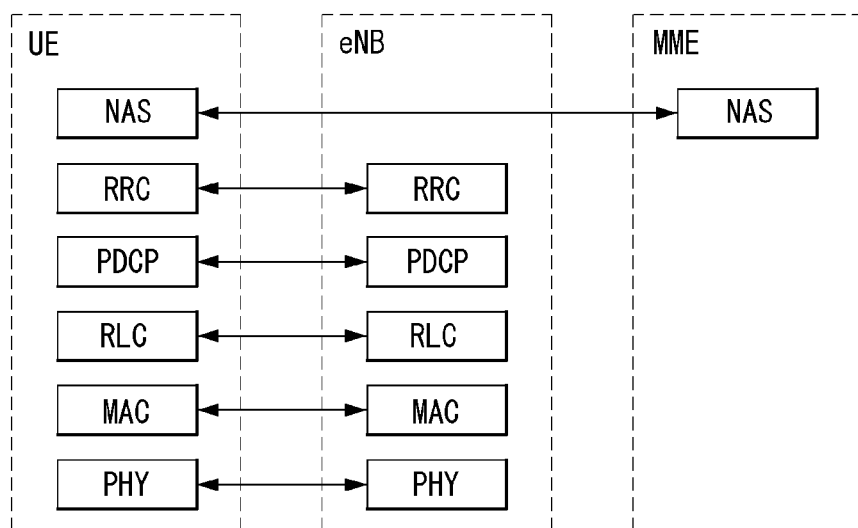
FIG. 4 illustrates a radio interface protocol structure between a UE and an E-UTRAN in a wireless communication system to which the present invention may be applied.
Figure 4:
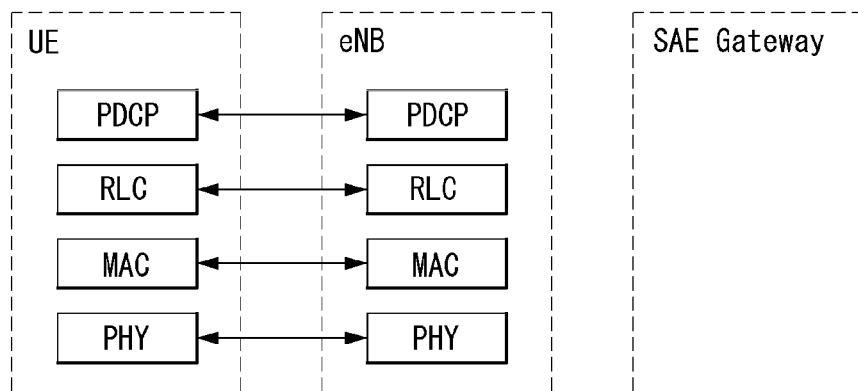

FIG. 4 illustrates a radio interface protocol structure between a UE and an E-UTRAN in a wireless communication system to which the present invention can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and includes unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

A logical channel lies above a transmission channel and is mapped to the transmission channel. The logical channel may be divided into a control channel for delivering control area information and a traffic channel for delivering user area information. The control channel may include a BCCH (Broadcast Control Channel), PCCH (Paging Control Channel), CCCH (Common Control Channel), DCCH (Dedicated Control Channel), and MCCH (Multicast Control Channel). The traffic channel may include a DTCH (Dedicated Traffic Channel) and MTCH (Multicast Traffic Channel). The PCCH is a downlink channel for delivering paging information and is used when a network does not know the cell to which a UE belongs. The CCCH is used by a UE that does not have an RRC connection to a network. The MCCH is a point-to-multipoint downlink channel used for delivering MBMS (Multimedia Broadcast and Multicast Service) control information from a network to a UE. The DCCH is a point-to-point bi-directional channel used by a UE with an RRC connection delivering dedicated control information between a UE and a network. The DTCH is a point-to-point channel dedicated to one UE for delivering user information that may exist in an uplink and downlink. The MTCH is a point-to-multipoint downlink channel for delivering traffic data from a network to a UE.

In the case of an uplink connection between a logical channel and a transport channel, the DCCH may be mapped to a UL-SCH, and the DTCH may be mapped to a UL-SCH, and the CCCH may be mapped to a UL-SCH. In the case of a downlink connection between a logical channel and a transport channel, the BCCH may be mapped to a BCH or DL-SCH, the PCCH may be mapped to a PCH, the DCCH may be mapped to a DL-SCH, the DTCH may be mapped to a DL-SCH, the MCCH may be mapped to an MCH, and the MTCH may be mapped to the MCH.

Figure 5:
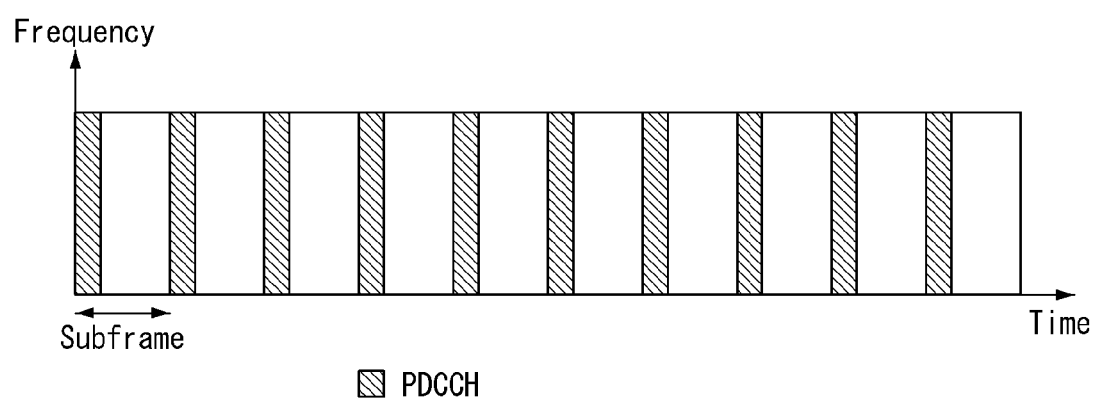
FIG. 5 is a diagram illustrating in brief the structure of a physical channel in a wireless communication system to which the present invention may be applied.

FIG. 5 is a diagram illustrating in brief the structure of a physical channel in a wireless communication system to which the present invention may be applied.

Referring to FIG. 5, a physical channel transfers signaling and data through radio resources including one or more subcarriers in a frequency domain and one or more symbols in a time domain.

One subframe having a length of 1.0 ms includes a plurality of symbols. A specific symbol(s) of the subframe (e.g., the first symbol of the subframe) may be used for a PDCCH. The PDCCH carries information (e.g., a resource block and modulation and coding scheme (MCS) and so on) about dynamically allocated resources.

New Generation Radio Access Network (NG-RAN) (or RAN) System

Terms used in a new generation radio access network may be defined as follows.

Evolved packet system (EPS): a network system including an evolved packet core (EPC), that is, an Internet protocol (IP)-based packet switched core network, and an access to network such as LTE or UTRAN. A network is an evolved network form of universal mobile telecommunications system (UMTS).

eNodeB: an eNB of an EPS network. It is disposed outdoors and has coverage of a macro cell volume.

International Mobile Subscriber Identity (IMSI): a user identity internationally uniquely allocated in a mobile communication network.

Public Land Mobile Network (PLMN): a network configured to provide persons with a mobile communication service. It may be differently configured for each operator.

5G system (5GS): a system including a 5G access network (AN), a 5G core network and a user equipment (UE).

5G access network (5G-AN) (or AN): an access network including a new generation radio access network (NG-RAN) and/or a non-3GPP access network (non-3GPP AN) connected to a 5G core network.

New generation radio access network (NG-RAN) (or RAN): a radio access network having a common characteristic in that it is connected to 5GC and supporting one or more of the following options:

1) Standalone new radio.
2) New radio, that is, an anchor supporting an E-UTRA extension.
3) Standalone E-UTRA (e.g., eNodeB).
4) Anchor supporting a new radio extension 5G core network (5GC): a core network connected to a 5G access network Network function (NF): it means a processing function adopted in 3GPP within a network or defined in 3GPP. The processing function includes a defined functional behavior and an interface defined in 3GPP.

NF service: it is a (consumed) function exposed by an NF through a service-based interface and used by another authenticated NF(s).

Network slice: a logical network providing a specific network capability(s) and network characteristic(s).

Network slice instance: a set of NF instance(s) forming a network slice and required resource(s) (e.g., calculation, storage and networking resources)

Protocol data unit (PDU) connectivity service: a service providing the exchange of PDU(s) between a UE and a data network.

PDU session: an association providing PDU connectivity service between a UE and a data network. An association type may be an Internet protocol (IP) or Ethernet or may be unstructured.

Non-access stratum (NAS): a functional layer for exchanging signaling or traffic messages between a UE and a core network in an EPS, 5GS protocol stack. It has a main function of supporting the mobility of a UE and supporting a session management procedure.

5G System Architecture to which the Present Invention May be Applied

A 5G system is a technology advanced from the 4th generation LTE mobile communication technology and a new radio access technology (RAT) through the evolution of the existing mobile communication network structure or a clean-state structure and an extended technology of long term evolution (LTE), and it supports extended LTE (eLTE), non-3GPP (e.g., WLAN) access and so on.

A 5G system is defined based on a service, and an interaction between network functions (NFs) within architecture for a 5G system may be expressed by two methods as follows.

Reference point representation (FIG. 6): indicates an interaction between NF services within NFs described by a point-to-point reference point (e.g., N11) between two NFs (e.g., AMF and SMF).

Service-based representation (FIG. 7): network functions (e.g., AMFs) within a control plane (CP) permit other authenticated network functions to access its own service. If this representation is necessary, it also includes a point-to-point reference point.

Figure 6:
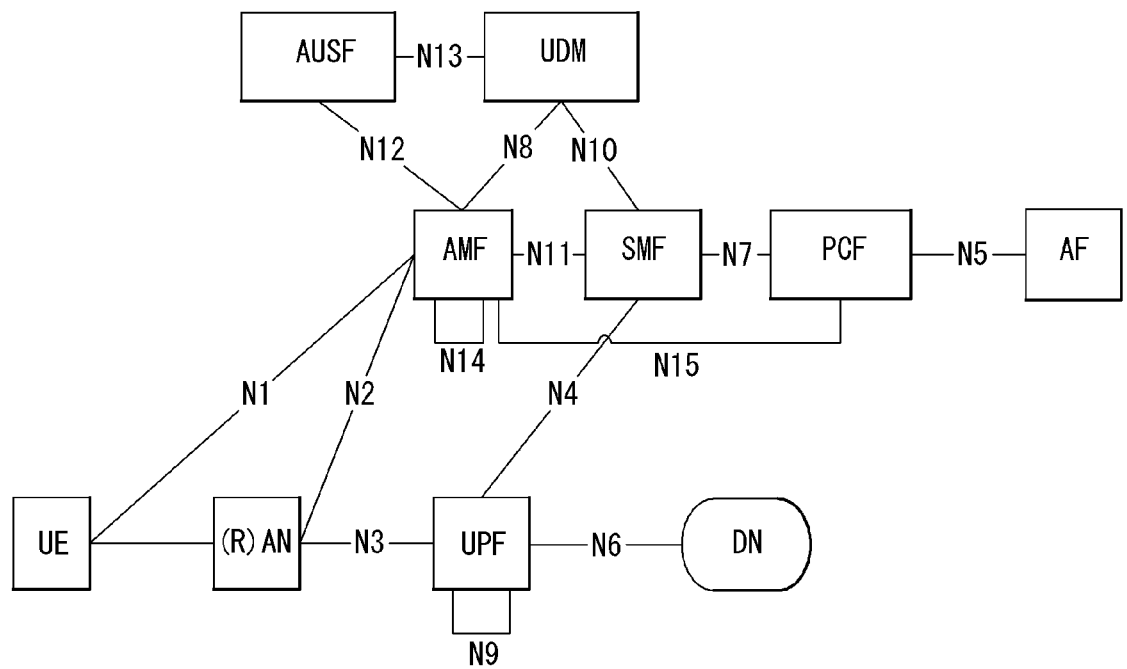
FIG. 6 is a diagram illustrating 5G system architecture using a reference point representation.

FIG. 6 is a diagram illustrating 5G system architecture using a reference point representation.

Referring to FIG. 6, the 5G system architecture may include various elements (i.e., a network function (NF)). This drawing illustrates an authentication server function (AUSF), a (core) access and mobility management function (AMF), a session management function (SMF), a policy control function (PCF), an application function (AF), united data management (UDM), a data network (DN), a user plane function (UPF), a (radio) access network ((R)AN) and a user equipment (UE) corresponding to some of the various elements.

Each of the NFs supports the following functions.

AUSF stores data for the authentication of a UE.

AMF provides a function for access of a UE unit and mobility management and may be basically connected to one AMF per one UE.

Specifically, the AMF supports functions, such as signaling between CN nodes for mobility between 3GPP access networks, the termination of a radio access network (RAN) CP interface (i.e., N2 interface), the termination (N1) of NAS signaling, NAS signaling security (NAS ciphering and integrity protection), AS security control, registration area management, connection management, idle mode UE reachability (including control and execution of paging retransmission), mobility management control (subscription and policy), intra-system mobility and inter-system mobility support, the support of network slicing, SMF selection, lawful interception (for an AMF event and an interface to an LI system), the provision of transfer of a session management (SM) message between a UE and an SMF, a transparent proxy for SM message routing, access authentication, access authorization including a roaming right check, the provision of transfer of an SMS message between a UE and an SMSF, a security anchor function (SEA) and/or security context management (SCM).

Some or all of the functions of the AMF may be supported within a single instance of one AMF.

DN means an operator service, Internet access or a 3rd party service, for example. The DN transmits a downlink protocol data unit (PDU) to an UPF or receives a PDU, transmitted by a UE, from a UPF.

PCF provides a function for receiving information about a packet flow from an application server and determining a policy, such as mobility management and session management. Specifically, the PCF supports functions, such as the support of a unified policy framework for controlling a network behavior, the provision of a policy rule so that a CP function(s) (e.g., AMF or SMF) can execute a policy rule, and the implementation of a front end for accessing related subscription information in order to determine a policy within user data repository (UDR).

SMF provides a session management function and may be managed by a different SMF for each session if a UE has a plurality of sessions.

Specifically, the SMF supports functions, such as session management (e.g., session setup, modification and release including the maintenance of a tunnel between a UPF and an AN node), UE IP address allocation and management (optionally including authentication), the selection and control of the UP function, a traffic steering configuration for routing traffic from the UPF to a proper destination, the termination of an interface toward policy control functions, the execution of the control part of a policy and QoS, lawful interception (for an SM event and an interface to an LI system), the termination of the SM part of an NAS message, downlink data notification, the initiator of AN-specific SM information (transferred to an AN through N2 via the AMF), the determination of an SSC mode of a session, and a roaming function.

Some or all of the functions of the SMF may be supported within a single instance of one SMF.

UDM stores the subscription data of a user, policy data, etc. UDM includes two parts, that is, an application front end (FE) and user data repository (UDR).

The FE includes a UDM FE responsible for the processing of location management, subscription management and credential and a PCF responsible for policy control. The UDR stores data required for functions provided by the UDM-FE and a policy profile required by the PCF. Data stored within the UDR includes user subscription data, including a subscription ID, security credential, access and mobility-related subscription data and session-related subscription data, and policy data. The UDM-FE supports functions, such as access to subscription information stored in the UDR, authentication credential processing, user identification handling, access authentication, registration/mobility management, subscription management, and SMS management.

UPF transfers a downlink PDU, received from a DN, to a UE via an (R)AN and transfers an uplink PDU, received from a UE, to a DN via an (R)AN.

Specifically, the UPF supports functions, such as an anchor point for intra/inter RAT mobility, the external PDU session point of interconnection to a data network, packet routing and forwarding, a user plane part for the execution of packet inspection and a policy rule, lawful interception, a traffic usage report, an uplink classifier for supporting the routing of traffic flow of a data network, a branching point for supporting a multi-home PDU session, QoS handling (e.g., the execution of packet filtering, gating and an uplink/downlink rate) for a user plane, uplink traffic verification (SDF mapping between a service data flow (SDF) and a QoS flow), transport level packet marking within the uplink and downlink, downlink packet buffering, and a downlink data notification triggering function. Some or all of the functions of the UPF may be supported within a single instance of one UPF.

AF interoperates with a 3GPP core network in order to provide services (e.g., support functions, such as an application influence on traffic routing, network capability exposure access, an interaction with a policy framework for policy control).

(R)AN collectively refers to a new radio access network supporting all of evolved E-UTRA (E-UTRA) and new radio (NR) access technologies (e.g., gNB), that is, an advanced version of the 4G radio access technology.

The gNB supports functions for radio resource management (i.e., radio bearer control and radio admission control), connection mobility control, the dynamic allocation (i.e., scheduling) of resources to a UE in the uplink/downlink, Internet protocol (IP) header compression, the encryption and integrity protection of a user data stream, the selection of an AMF upon attachment of a UE if routing to the AMF has not been determined based on information provided to the UE, the selection of an AMF upon attachment of a UE, user plane data routing to an UPF(s), control plane information routing to an AMF, connection setup and release, the scheduling and transmission of a paging message (generated from an AMF), the scheduling and transmission of system broadcast information (generated from an AMF or operation and maintenance (O&M)), a measurement and measurement report configuration for mobility and scheduling, transport level packet marking in the uplink, session management, the support of network slicing, QoS flow management and mapping to a data radio bearer, the support of a UE that is an inactive mode, the distribution function of an NAS message, an NAS node selection function, radio access network sharing, dual connectivity, and tight interworking between an NR and an E-UTRA.

UE means a user device. A user apparatus may be called a term, such as a terminal, a mobile equipment (ME) or a mobile station (MS). Furthermore, the user apparatus may be a portable device, such as a notebook, a mobile phone, a personal digital assistant (PDA), a smartphone or a multimedia device, or may be a device that cannot be carried, such as a personal computer (PC) or a vehicle-mounted device.

In the drawings, for the clarity of description, an unstructured data storage network function (UDSF), a structured data storage network function (SDSF), a network exposure function (NEF) and an NF repository function (NRF) are not shown, but all of the NFs shown in this drawing may perform mutual operations along with the UDSF, NEF and NRF, if necessary.

NEF provides means for safely exposing services and capabilities provided by 3GPP network functions, for example, for a 3rd party, internal exposure/re-exposure, an application function, and edge computing. The NEF receives information from other network function(s) (based on the exposed capability(s) of other network function(s)). The NEF may store information received as structured data using a standardized interface as a data storage network function. The stored information is re-exposed to other network function(s) and application function(s) by the NEF and may be used for other purposes, such as analysis.

NRF supports a service discovery function. It receives an NF discovery request from an NF instance and provides information of a discovered NF instance to an NF instance. Furthermore, it maintains available NF instances and services supported by the available NF instances.

SDSF is an optional function for supporting a function of storing and retrieving information as structured data by any NEF.

UDSF is an optional function for supporting a function of storing and retrieving information as unstructured data by any NF.

Meanwhile, this drawing illustrates a reference model if a UE accesses one DN using one PDU session, for convenience of description, but the present invention is not limited thereto.

A UE may access two (i.e., local and central) data networks at the same time using multiple PDU sessions. In this case, for different PDU sessions, two SMFs may be selected. In this case, each SMF may have the ability to control both a local UPF and central UPF within a PDU session.

Furthermore, a UE may access two (i.e., local and central) data networks provided within one PDU session at the same time.

In the 3GPP system, a conceptual link that connects NFs within the 5G system is defined as a reference point. The following illustrates reference points included in 5G system architecture represented in this drawing.

Figure 7:
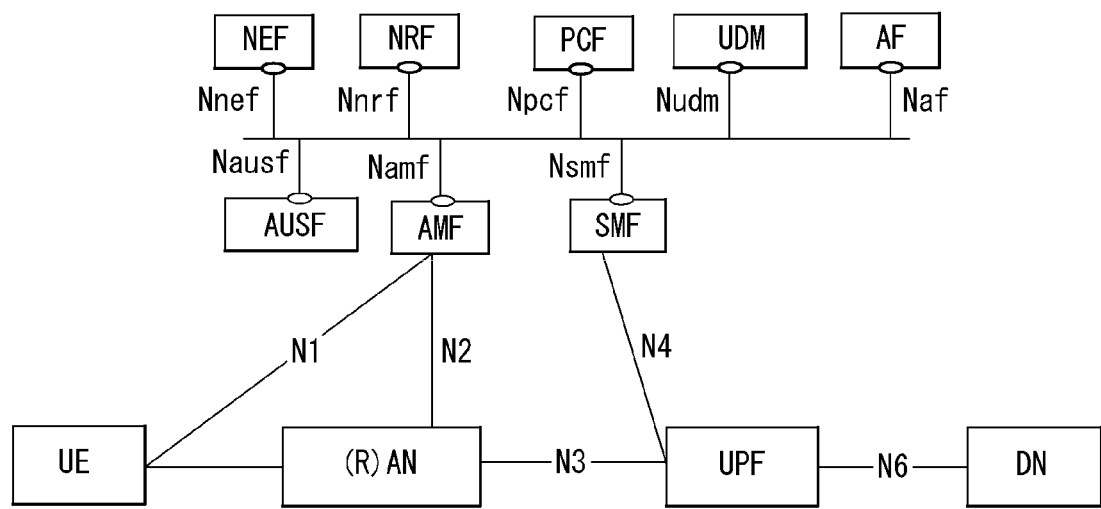
FIG. 7 is a diagram illustrating 5G system architecture using a service-based representation.

N1: a reference point between a UE and an AMF
N2: a reference point between an (R)AN and an AMF
N3: a reference point between an (R)AN and a UPF
N4: a reference point between an SMF and a UPF
N5: a reference point between a PCF and an AF
N6: a reference point between a UPF and a data network
N7: a reference point between an SMF and a PCF
N24: a reference point between a PCF within a visited network and a PCF within a home network
N8: a reference point between a UDM and an AMF
N9: a reference point between two core UPFs
N10: a reference point between a UDM and an SMF
N11: a reference point between an AMF and an SMF
N12: a reference point between an AMF and an AUSF
N13: a reference point between a UDM and an authentication server function (AUSF)
N14: a reference point between two AMFs
N15: a reference point between a PCF and an AMF in the case of a non-roaming scenario and a reference point between a PCF within a visited network and an AMF in the case of a roaming scenario
N16: a reference point between two SMFs (in the case of a roaming scenario, a reference point between an SMF within a visited network and an SMF within a home network)
N17: a reference point between an AMF and an EIR
N18: a reference point between any NF and an UDSF
N19: a reference point between an NEF and an SDSF FIG. 7 is a diagram illustrating 5G system architecture using a service-based representation.

A service-based interface illustrated in this drawing shows a set of services provided/exposed by a specific NF. The service-based interface is used within a control plane. The following illustrates service-based interfaces included in the 5G system architecture represented as in this drawing.

Namf: a service-based interface exhibited by an AMF
Nsmf: a service-based interface exhibited by an SMF
Nnef: a service-based interface exhibited by an NEF
Npcf: a service-based interface exhibited by a PCF
Nudm: a service-based interface exhibited by a UDM
Naf: a service-based interface exhibited by an AF
Nnrf: a service-based interface exhibited by an NRF
Nausf: a service-based interface exhibited by an AUSF NF service is a kind of capability exposed to another NF (i.e., NF service consumer) by an NF (i.e., NF service supplier) through a service-based interface. The NF may expose one or more NF service(s). In order to define NF service, the following criteria are applied:

NF services are derived from an information flow for describing an end-to-end function.

A complete end-to-end message flow is described by the sequence of NF service invocation.

Two operations for NF(s) to provide their services through service-based interfaces are as follows:

i) "Request-response": a control plane NF_B (i.e., NF service supplier) receives a request to provide a specific NF service (including the execution of an operation and/or the provision of information) from another control plane NF_A (i.e., NF service consumer). NF_B sends NF service results based on information provided by NF_A within a request as a response.

In order to satisfy a request, NF_B may alternately consume NF services from other NF(s). In the request-response mechanism, communication is performed in a one-to-one manner between two NFs (i.e., consumer and supplier).

ii) "subscribe-notify"

A control plane NF_A (i.e., NF service consumer) subscribes to an NF service provided by another control plane NF_B (i.e., NF service supplier). A plurality of control plane NF(s) may subscribe to the same control plane NF service. NF_B notifies interested NF(s) that have subscribed to NF services of the results of the NF services. A subscription request from a consumer may include a notification request for notification triggered through periodical update or a specific event (e.g., the change, specific threshold arrival, etc. of requested information). The mechanism also includes a case where NF(s) (e.g., NF_B) implicitly subscribe to specific notification without an explicit subscription request (e.g., due to a successful registration procedure).

Figure 8:
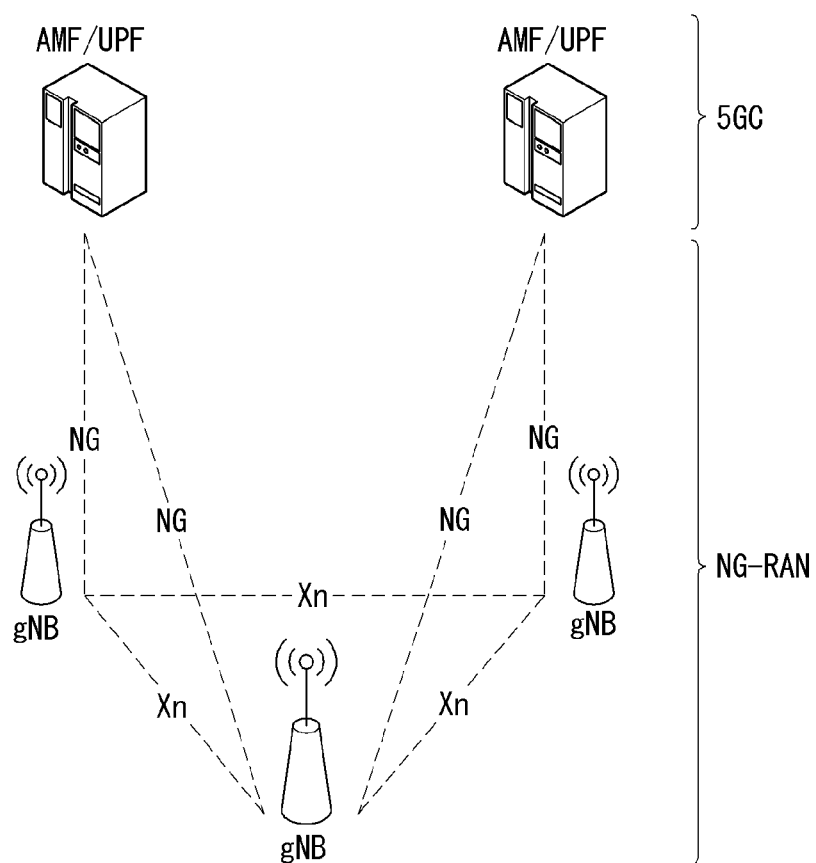
FIG. 8 illustrates NG-RAN architecture to which the present invention may be applied.

FIG. 8 illustrates NG-RAN architecture to which the present invention may be applied.

Referring to FIG. 8, a new generation radio access network (NG-RAN) includes an NR NodeB (gNB)(s) and/or an eNodeB (eNB)(s) for providing the termination of a user plane and control plane protocol toward a UE.

An Xn interface is connected between gNBs and between a gNB(s) and an eNB(s) connected to 5GC. The gNB(s) and the eNB(s) are also connected to 5GC using an NG interface. More specifically, the gNB(s) and eNB(s) are also connected to an AMF using an NG-C interface (i.e., N2 reference point), that is, a control plane interface between an NG-RAN and 5GC and are connected to a UPF using an NG-U interface (i.e., N3 reference point), that is, a user plane interface between an NG-RAN and 5GC.

Radio Protocol Architecture

Figure 9:
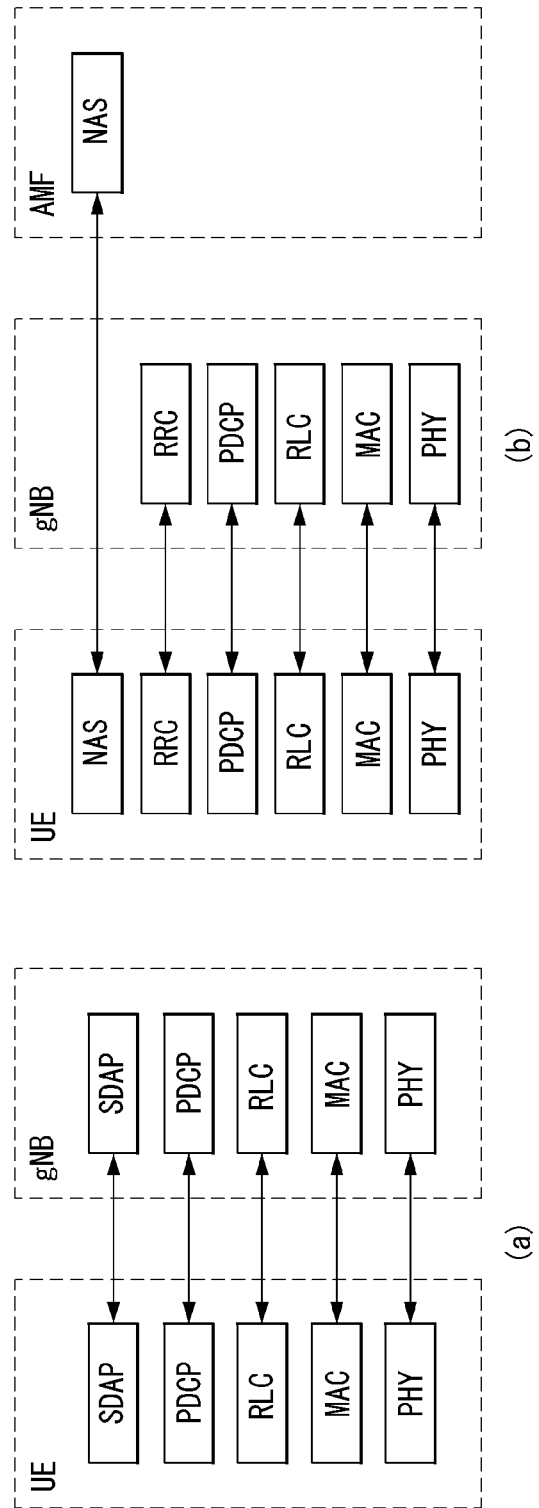
FIG. 9 is a diagram illustrating a radio protocol stack to which the present invention may be applied.

FIG. 9 is a diagram illustrating a radio protocol stack to which the present invention may be applied. Specifically, FIG. 9(a) illustrates a radio interface user plane protocol stack between a UE and a gNB, and FIG. 9(b) illustrates a radio interface control plane protocol stack between the UE and the gNB.

A control plane means a passage through which control messages are transmitted in order for a UE and a network to manage a call. A user plane means a passage through which data generated in an application layer, for example, voice data or Internet packet data is transmitted.

Referring to FIG. 9(a), the user plane protocol stack may be divided into a first layer (Layer 1) (i.e., a physical layer (PHY) layer) and a second layer (Layer 2).

Referring to FIG. 9(b), the control plane protocol stack may be divided into a first layer (i.e., a PHY layer), a second layer, a third layer (i.e., a radio resource control (RRC) layer) and a non-access stratum (NAS) layer.

The second layer is divided into a medium access control (MAC) sublayer, a radio link control (RLC) sublayer, a packet data convergence protocol (PDC) sublayer, and a service data adaptation protocol (SDAP) sublayer (in the case of a user plane).

Radio bearers are classified into two groups: a data radio bearer (DRB) for user plane data and a signaling radio bearer (SRB) for control plane data Hereinafter, the layers of the control plane and user plane of the radio protocol are described.

1) The PHY layer, that is, the first layer, provides information transfer service to a higher layer using a physical channel. The PHY layer is connected to the MAC sublayer located in a high level through a transport channel. Data is transmitted between the MAC sublayer and the PHY layer through a transport channel. The transport channel is classified depending on how data is transmitted according to which characteristics through a radio interface. Furthermore, data is transmitted between different physical layers, that is, between the PHY layer of a transmission stage and the PHY layer of a reception stage through a physical channel.

2) The MAC sublayer performs mapping between a logical channel and a transport channel; the multiplexing/demultiplexing of an MAC service data unit (SDU) belonging to one logical channel or different logical channels to/from a transport block (TB) transferred to/from the PHY layer through a transport channel; a scheduling information report; error correction through a hybrid automatic repeat request (HARQ); priority handling between UEs using dynamic scheduling; priority handling between the logical channels of one UE using logical channel priority; and padding.

Different types of data transfer service provided by the MAC sublayer. Each logical channel type defines that information of which type is transferred.

Logical channels are classified into two groups: a control channel and a traffic channel.

i) The control channel is used to transfer only control plane information and is as follows.
Broadcast control channel (BCCH): a downlink channel system for broadcasting control information.
Paging control channel (PCCH): a downlink channel transferring paging information and system information change notification.
Common control channel (CCCH): a channel for transmitting control information between a UE and a network. This channel is used for UEs not having an RRC connection with a network.
Dedicated control channel (DCCH): a point-to-point bidirectional channel for transmitting dedicated control information between a UE and a network. It is used by a UE having an RRC connection.

ii) The traffic channel is used to use only user plane information:
Dedicated traffic channel (DTCH): a point-to-point channel for transferring user information and dedicated to a single UE. The DTCH may be present in both the uplink and downlink.

In the downlink, a connection between a logical channel and a transport channel is as follows.

A BCCH may be mapped to a BCH. A BCCH may be mapped to a DL-SCH. A PCCH may be mapped to a PCH. A CCCH may be mapped to a DL-SCH. A DCCH may be mapped to a DL-SCH. A DTCH may be mapped to a DL-SCH.

In the uplink, a connection between a logical channel and a transport channel is as follows. A CCCH may be mapped to an UL-SCH. A DCCH may be mapped to an UL-SCH. A DTCH may be mapped to an UL-SCH.

3) The RLC sublayer supports three transport modes: a transparent mode (TM), an unacknowledged mode (UM) and acknowledged mode (AM).

An RLC configuration may be applied to each logical channel. In the case of an SRB, the TM or AM mode is used. In contrast, in the case of a DRB, the UM or AM mode is used.

The RLC sublayer performs the transfer a higher layer PDU; independent sequence numbering with a PDCP; error correction through an automatic repeat request (ARW); segmentation and re-segmentation; the reassembly of an SDU; RLC SDU discard; and RLC re-establishment.

4) The PDCP sublayer for a user plane performs sequence numbering; header compression and compression-decompression (corresponding to only robust header compression (RoHC)); user data transfer; reordering and duplicate detection (if there is transfer to a layer higher than the PDCP); PDCP PDU routing (in the case of a split bearer); the retransmission of a PDCP SDU; ciphering and deciphering; PDCP SDU discard; PDCP re-establishment and data recovery for RLC AM; and the duplication of a PDCP PDU.

The PDCP sublayer a control plane additionally performs sequence numbering; ciphering, deciphering and integrity protection; control plane data transfer; duplication detection; the duplication of a PDCP PDU.

When duplication for a radio bearer is configured by RRC, an additional RLC entity and an additional logical channel are added to a radio bearer in order to control a duplicated PDCP PDU(s). In the PDCP, duplication includes transmitting the same PDCP PDU(s) twice. The first one is transferred to the original RLC entity, and the second one is transferred to an additional RLC entity. In this case, the duplication corresponding to the original PDCP PDU is not transmitted to the same transport block. Different two logical channels may belong to the same MAC entity (in the case of a CA) or to different MAC entities (in the case of DC). In the former case, a logical channel mapping restriction is used to guarantee that a duplication corresponding to the original PDCP PDU is not transferred to the same transport block.

5) The SDAP sublayer performs i) mapping between a QoS flow and a data radio bearer and ii) QoS flow ID marking within a downlink and uplink packet.

One protocol entity of an SDAP is configured for each PDU session, but exceptionally in the case of dual connectivity (DC), two SDAP entities may be configured.

6) The RRC sublayer performs the broadcasting of system information related to an access stratum (AS) and a non-access stratum (NAS); paging initiated by 5GC or an NG-RAN; the establishment, maintenance and release (additionally including the modification and release of a carrier aggregation and additionally including the modification and release of dual connectivity between an E-UTRAN and an NR or within an NR) of an RRC connection between a UE and an NG-RAN; a security function including key management; the establishment, configuration, maintenance and release of an SRB(s) and a DRB(s); handover and context transfer; control of UE cell selection, re-release and cell selection/reselection; a mobility function including mobility between RATs; a QoS management function, a UE measurement report and report control; the detection of a radio link failure and recovery from a radio link failure; and the transfer of an NAS message from an NAS to a UE and the transfer of an NAS message from a UE to an NAS.

Network Slicing

A 5G system has introduced a network slicing technology which provides network resources and network functions to an independent slice based on each service.

As network slicing is introduced, the isolation, independent management, etc. of a network function and network resources can be provided for each slice. Accordingly, services that are independent for each service or user and that are more flexible can be provided by selecting and combining network functions of the 5G system depending on a service or user.

A network slice refers to a network that logically integrates an access network and a core network.

The network slice may include one or more of the followings:

Core network control plane and user plane function
NG-RAN
Non-3GPP interworking function (N3IWF) toward a non-3GPP access network A function supported for each network slice and network function optimization may be different. A plurality of network slice instances may provide the same function to different groups of UEs.

One UE may be connected to one or more network slice instances at the same time via a 5G-AN. One UE may be served at the same time by a maximum of 8 network slices. An AMF instance that serves a UE may belong to each network slice instance that serves the UE. That is, the AMF instance may be common to a network slice instance that serves the UE. The CN part of a network slice instance(s) that serves a UE is selected by a CN.

One PDU session belongs to only a specific one network slice instance for each PLMN. Different network slice instances do not share one PDU session.

One PDU session belongs to a specific one network slice instance for each PLMN. Different slices may have slice-specific PDU sessions using the same DNN, but different network slice instances do not share one PDU session.

Single network slice selection assistance information (S-NSSAI) identifies a network slice. Each S-NSSAI is assistant information used for a network to select a specific network slice instance. The NSSAI is a set of S-NSSAI(s). The S-NSSAI includes the followings:

Slice/service type (SST): the SST indicates the operation of a network slice expected form a viewpoint of a function and service.
Slice differentiator (SD): the SD is optional information that supplements an SST(s) for selecting a network slice instance from a plurality of potential network slice instances all of which comply with an indicated SST.

1) Upon Initial Access, Network Slice Selection

A Configured NSSAI may be configured in a UE by a home PLMN (HPLMN) for each PLMN. The Configured NSSAI becomes PLMN-specific, and the HPLMN indicates a PLMN(s) to which each Configured NSSAI has been applied.

Upon initial connection of a UE, an RAN selects an initial network slice that will transfer a message using an NSSAI. To this end, in a registration procedure, a UE provides a requested NSSAI to a network. In this case, when the UE provides the requested NSSAI to the network, a UE within a specific PLMN uses only S-NSSAIs belonging to the Configured NSSAI of the corresponding PLMN.

If a UE does not provide an NSSAI to an RAN and an RAN does not select a proper network slice based on the provided NSSAI, the RAN may select a default network slice.

Subscription data includes the S-NSSAI(s) of a network slice(s) to which a UE has subscribed. One or more S-NSSAI(s) may be marked as a default S-NSSAI. When an S-NSSAI is marked by default, although a UE does not transmit any S-NSSAI to a network within a Registration Request, the network may serve the UE through a related network slice.

When a UE is successfully registered, a CN notifies an (R)AN of all of Allowed NSSAIs (including one or more S-NSSAIs) by providing the NSSAIs. Furthermore, when the registration procedure of the UE is successfully completed, the UE may obtain an Allowed NSSAI for a PLMN from an AMF.

The Allowed NSSAI has precedence over the Configured NSSAI for the PLMN. Thereafter, the UE uses only an S-NSSAI(s) within the Allowed NSSAI corresponding to a network slice for a network slice selection-related procedure within the serving PLMN.

In each PLMN, a UE stores a Configured NSSAI and an Allowed NSSAI (if present). When the UE receives an Allowed NSSAI for a PLMN, it overrides the previously stored Allowed NSSAI for the PLMN.

2) Slice Change

A network may change an already selected network slice instance depending on a local policy and the mobility, subscription information change, etc. of a UE. That is, a set of network slices of a UE may be changed at any time while the UE is registered with a network. Furthermore, a change of a set of network slices of a UE may be initiated by a network or under specific conditions.

A network may change a set of allowed network slice(s) with which a UE has been registered based on a local policy, a subscription information change and/or the mobility of the UE. A network may perform such a change during a registration procedure or may notify a UE of a change of a supported network slice(s) using a procedure capable of triggering a registration procedure.

Upon changing the network slice, the network may provide the UE with a new Allowed NSSAI and a tracking area list. The UE includes the new NSSAI in signaling according to a mobility management procedure and transmits the signaling, thereby causing the reselection of a slice instance. An AMF supporting the slice instance may also be changed in response to a change of the slice instance.

When a UE enters an area in which a network slice is no longer available, a core network releases a PDU session for an S-NSSAI corresponding to a network slice that is no longer available through a PDU session release procedure.

When the PDU session corresponding to the slice that is no longer available is released, the UE determines whether the existing traffic can be routed through a PDU session belonging to another slice using a UE policy.

For a change of a set of used S-NSSAI(s), a UE initiates a registration procedure.

3) SMF Selection

A PCF provides a UE with a network slice selection policy (NSSP). The NSSP associates the UE with an S-NSSAI and is used by the UE in order to determine a PDU session to which traffic will be routed.

A network slice selection policy is provided for each application of a UE. This includes a rule by which an S-NSSAI can be mapped for each UE application. The AMF selects an SMF for PDU session management using subscriber information and a local operator policy along with an SM-NSSAI transferred by a UE and DNN information.

When a PDU session for a specific slice instance is established, a CN provides an (R)AN with an S-NSSAI corresponding to the slice instance to which the PDU session belongs so that an RAN can access a specific function of a slice instance.

Session Management

5GC supports a PDU connectivity service, that is, a service that provides the exchange of PDU(s) between a UE and a DN identified by a data network name (DNN) (or an access point name (APN)). The PDU connectivity service is also supported through a PDU session established upon request from the UE.

Each PDU session supports a single PDU session type. That is, when the PDU session is established, it supports the exchange of PDUs of a single type requested by a UE. The following PDU session types are defined. IP version 4 (IPv4), IP version 6 (IPv6), Ethernet, and unstructured. In this case, the type of PDUs exchanged between a UE and a DN are completely transparent in a 5G system.

A PDU session is established using NAS SM signaling exchanged between a UE and an SMF through N1 (upon UE request), modified (upon UE and 5GC request), and released (upon UE and 5GC request). Upon request from an application server, 5GC may trigger a specific application within a UE. When the UE receives a trigger message, it transfers the corresponding message to an identified application. The identified application may establish a PDU session with a specific DNN.

An SMF checks whether a UE request complies with user subscription information. To this end, the SMF obtains SMF level subscription data from UDM. Such data may indicate an accepted PDU session type for each DNN:

A UE registered through a plurality of accesses selects access for setting up a PDU session.

A UE may request to move a PDU session between 3GPP and non-3GPP access. A determination for moving the PDU session between 3GPP and non-3GPP access is made for each PDU session. That is, the UE may have a PDU session using 3GPP access while another PDU session uses non-3GPP access.

Within a PDU session setup request transmitted by a network, a UE provides a PDU session identity (ID). Furthermore, the UE may provide a PDU session type, slicing information, a DNN, service and a session continuity (SSC) mode.

A UE may establish a plurality of PDU sessions with the same DN or different DNs at the same time via 3GPP access and/or via non-3GPP access.

A UE may establish a plurality of PDU sessions with the same DN served by a different UPF end N6.

A UE having a plurality of established PDU sessions may be served by different SMFs.

The user plane path of a different PDU sessions belonging to the same UE (the same or different DNNs) may be fully separated between an UPF and AN interfacing with a DN.

5G system architecture can satisfy various continuity requirements of different application/services within a UE by supporting a session and service continuity (SCC). A 5G system supports different SSC modes. An SSC mode associated with a PDU session anchor is not changed while a PDU session is established.

In the case of a PDU session to which SSC Mode 1 is applied, a network maintains continuity service provided to a UE. In the case of a PDU session of an IP type, an IP address is maintained.

If SSC Mode 2 is used, a network may release continuity service delivered to a UE. Furthermore, the network may release a corresponding PDU session. In the case of a PDU session of an IP type, a network may release an IP address(es) allocated to a UE.

If SSC Mode 3 is used, a change of a user plane can be aware by a UE, but network guarantees that the UE does not lose connectivity. In order to permit better service continuity, a connection through a new PDU session anchor point is established before a previous connection is terminated. In the case of a PDU session of an IP type, an IP address is not maintained while an anchor is deployed again.

An SSC mode selection policy is used to determine the type of SSC mode associated with an application (or application group) of a UE. An operator may previously configure an SSC mode selection policy in a UE. The policy includes one or more SSC mode selection policy rules which may be used for a UE to determine the type of SSC mode associated with an application (or a group of applications). Furthermore, the policy may include a default SSC mode selection policy rule which may be applied to all of applications of a UE.

If a UE provides an SSC mode when it requests a new PDU session, an SMF selects whether it will accept the requested SSC mode or whether it will modify the requested SSC mode based on subscription information and/or a local configuration. If a UE does not provide an SSC mode when it requests a new PDU session, an SMF selects a default SSC mode for data networks listed within subscription information or applies a local configuration for selecting an SSC mode.

An SMF notifies a UE of an SSC mode selected for a PDU session.

Mobility Management

Registration management (RM) is used to register or deregister a UE/user with/from a network and to establish user context within a network.

1) Registration Management

A UE/user needs to register a network in order to receive service that requests registration. Once the UE/user is registered, the UE may update its own registration with the network in order to periodically maintain reachability (periodical registration update) if applicable, upon moving (mobility registration update), or in order to update its own capability or negotiate a protocol parameter again.

An initial registration procedure includes the execution of a network access control function (i.e., user authentication and access authentication based on a subscription profile within UDM). As the results of the registration procedure, the ID of a serving AMF within the UDM is registered.

Figure 10:
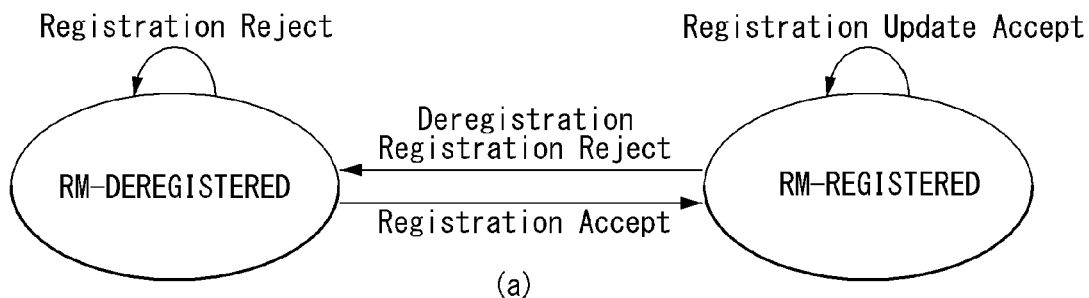
FIG. 10 illustrates RM state models to which the present invention may be applied.
Figure 10:
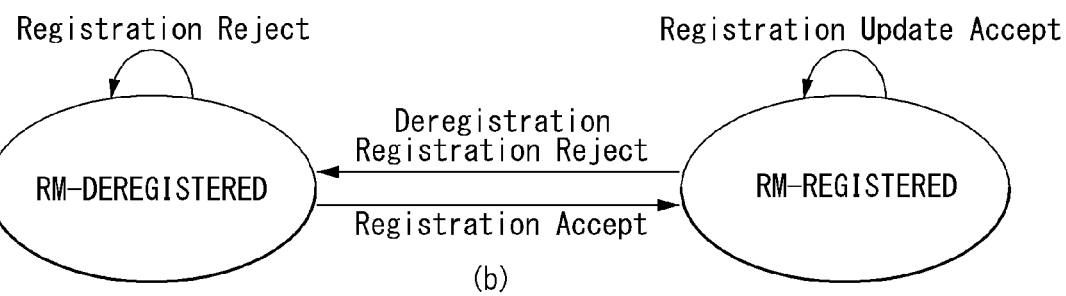

FIG. 10 illustrates RM state models to which the present invention may be applied. Specifically, FIG. 10(a) shows an RM state model within a UE, and FIG. 10(b) shows an RM state model within an AMF.

Referring to FIG. 10, in order to reflect the registration state of a UE within a selected PLMN, two RM states of RM-DEREGISTERED and RM-REGISTERED are used within the UE and the AMF.

In the RM-DEREGISTERED state, the UE is not registered with a network. The valid location or routing information of UE context within the AMF is not maintained. Accordingly, the UE is not reachable by the AMF. However, for example, in order to prevent an authentication procedure from being executed for each registration procedure, some UE context may be still stored in the UE and the AMF.

In the RM-DEREGISTERED state, if the UE needs to receive service that requests registration, the UE attempts registration with a selected PLMN using the initial registration procedure. Alternatively, upon initial registration, when the UE receives a Registration Reject, the UE remains in the RM-DEREGISTERED state. In contrast, when the UE receives the Registration Accept, it enters the RM-REGISTERED state.

In the RM-DEREGISTERED state, if applicable, the AMF accepts the initial registration of the UE by transmitting a Registration Accept to the UE, and enters the RM-REGISTERED state. Alternatively, if applicable, the AMF rejects the initial registration of the UE by transmitting a Registration Reject to the UE.

In the RM-REGISTERED state, the UE is registered with the network. In the RM-REGISTERED state, the UE may receive service that requests registration with the network.

In the RM-REGISTERED state, if the tracking area identity (TAI) of a current serving cell is not present within a list of TAIs that has been received by the UE from a network, the registration of the UE is maintained. The UE performs a mobility registration update procedure so that the AMF can page the UE. Alternatively, in order to notify a network that the UE is still in the active state, the UE performs a periodic registration update procedure when a periodical update timer expires. Alternatively, in order to update its own capability information or negotiate a protocol parameter with a network again, the UE performs a registration update procedure. Alternatively, if the UE does no longer require registration with a PLMN, the UE performs a deregistration procedure and enters the RM-DEREGISTERED state. The UE may determine deregistration from the network at any time. Alternatively, when the UE receives a Registration Reject message, a Deregistration message or performs a local deregistration procedure without the initiation of any signaling, it enters the RM-DEREGISTERED state.

In the RM-REGISTERED state, when the UE does no longer need to be registered with the PLMN, the AMF performs a deregistration procedure and enters the RM-DEREGISTERED state. The AMF may determine the deregistration of the UE at any time. Alternatively, after an implicit deregistration timer expires, the AMF performs implicit deregistration at any time. The AMF enters the RM-DEREGISTERED state after the implicit deregistration. Alternatively, the AMF performs local deregistration for the UE that has negotiated deregistration at the end of communication. The AMF enters the RM-DEREGISTERED state after local deregistration. Alternatively, if applicable, the AMF accepts or rejects registration update from the UE. The AMF may reject UE registration when it rejects the registration update from the UE.

Registration area management includes a function for allocating or re-allocating a registration area to the UE. The registration area is managed for each access type (i.e., 3GPP access or non-3GPP access).

When the UE is registered with a network through 3GPP access, the AMF allocates a set of tracking area (TA)(s) within a TAI list to the UE. When the AMF allocates a registration area (i.e., a set of TAs within the TAI list), the AMF may consider various types of information (e.g., a mobility pattern and an accepted/non-accepted area). The AMP having the whole PLMN or all of PLMNs as a serving area may allocate the whole PLMN, that is, a registration area, to the UE in the MICO mode.

A 5G system supports the allocation of a TAI list including different 5G-RAT(s) within a single TAI list.

When the UE is registered with a network through non-3GPP access, a registration area for the non-3GPP access corresponds to a unique reserved TAI value (i.e., dedicated to the non-3GPP access). Accordingly, there is a unique TA for the non-3GPP access to 5GC, which is called an N3GPP TAI.

When the TAI list is generated, the AMF includes only a TAI(s) applicable to access through which the TAI list has been transmitted.

2) Connection Management

Connection management (CM) is used to establish and release a signaling connection between the UE and the AMF. CM includes a function of establishing and releasing a signaling connection between the UE and the AMF through N1. The signaling connection is used to enable an NAS signaling exchange between the UE and a core network. The signaling connection includes both an AN signaling connection for the UE between the UE and the AN and an N2 connection for the UE between the AN and the AMF.

Figure 11:
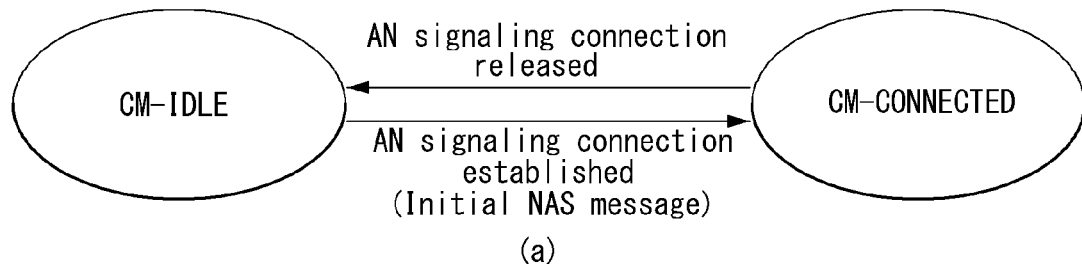
FIG. 11 illustrates CM state models to which the present invention may be applied.
Figure 11:
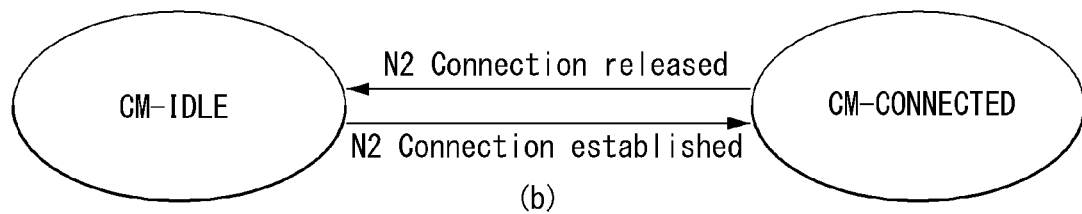

FIG. 11 illustrates CM state models to which the present invention may be applied. Specifically, FIG. 11 (a) illustrates a CM state shift within a UE, and FIG. 11 (b) shows a CM state shift within an AMF.

Referring to FIG. 11, in order to reflect the NAS signaling connection of the UE with the AMF, two CM states of CM-IDLE and CM-CONNECTED are used.

The UE in the CM-IDLE state is the RM-REGISTERED state and does not have an NAS signaling connection established with the AMF through N1. The UE performs cell selection, cell reselection and PLMN selection.

An AN signaling connection, an N2 connection and an N3 connection for the UE in the CM-IDLE state are not present.

In the CM-IDLE state, if the UE is not in the MICO mode, it responds to paging by performing a Service Request procedure (if it has received it). Alternatively, when the UE has uplink signaling or user data to be transmitted, it performs a Service Request procedure. Alternatively, whenever an AN signaling connection is established between the UE and the AN, the UE enters the CM-CONNECTED state. Alternatively, the transmission of an initial NAS message (Registration Request, Service Request or Deregistration Request) starts to shift from the CM-IDLE state to the CM-CONNECTED state.

In the CM-IDLE state, if the UE is not in the MICO mode, when the AMF has signaling or the mobile-terminated data to be transmitted to the UE, it performs a network-triggered service request procedure by transmitting a paging request to the corresponding UE. Whenever an N2 connection for a corresponding UE between the AN and the AMF is established, the AMF enters the CM-CONNECTED state.

The UE in the CM-CONNECTED state has an NAS signaling connection with the AMF through N1.

In the CM-CONNECTED state, whenever the AN signaling connection is released, the UE enters the CM-IDLE state.

In the CM-CONNECTED state, whenever an N2 signaling connection and N3 connection for the UE are released, the AMF enters the CM-IDLE state.

When an NAS signaling procedure is completed, the AMF may determine to release the NAS signaling connection of the UE. When the AN signaling connection release is completed, the CM state within the UE changes to the CM-IDLE. When an N2 context release procedure is completed, the CM state for the UE within the AMF changes to the CM-IDLE.

The AMF may maintain the UE in the CM-CONNECTED state until the UE is deregistered from a core network.

The UE in the CM-CONNECTED state may be an RRC Inactive state. When the UE is in the RRC Inactive state, UE reachability is managed by an RAN using assistant information from a core network. Furthermore, when the UE is in the RRC Inactive state, UE paging is managed by the RAN. Furthermore, when the UE is in the RRC Inactive state, the UE monitors paging using the CN and RAN ID of the UE.

The RRC Inactive state is applied to an NG-RAN (i.e., applied to an NR and E-UTRA connected to 5G CN).

The AMF provides assistant information to the NG-RAN in order to assist the determination of the NG-RAN regarding whether the UE will be changed to the RRC Inactive state based on a network configuration.

The RRC Inactive assistant information includes a UE-specific discontinuous reception (DRX) value for RAN paging during the RRC Inactive state and a registration area provided to the UE.

CN assistant information is provided to a serving NG RAN node during N2 activation (i.e., registration, a service request or path switch).

The state of an N2 and the N3 reference point is not changed by the UE that enters the CM-CONNECTED state accompanied by RRC Inactive. The UE in the RRC Inactive state is aware of an RAN notification area.

When the UE is the CM-CONNECTED state accompanied by RRC Inactive, the UE may resume an RRC connection due to uplink data pending, a mobile-initiated signaling procedure (i.e., periodical registration update), a response to RAN paging, or when the UE notifies a network that it has deviated from the RAN notification area.

When the connection of the UE in a different NG-RAN node within the same PLMN resumes, UE AS context is recovered from an old NG RAN node, and the procedure is triggered toward a CN.

When the UE is in the CM-CONNECTED state accompanied by RRC Inactive, the UE performs cell selection on a GERAN/UTRAN/EPS and complies with an idle mode procedure.

Furthermore, the UE in the CM-CONNECTED state accompanied by RRC Inactive enters the CM-IDLE mode and complies with an NAS procedure related to the following cases.

If an RRC resumption procedure fails,

If a movement to the CM-IDLE mode of the UE is required within a failure scenario that cannot be solved in the RRC Inactive mode.

The NAS signaling connection management includes a function for establishing and releasing an NAS signaling connection.

The NAS signaling connection establishment function is provided by the UE and the AMF in order to establish the NAS signaling connection of the UE in the CM-IDLE state.

When the UE in the CM-IDLE state needs to transmit an NAS message, the UE initiates a service request or registration procedure in order to establish a signaling connection to the AMF.

The AMF may maintain the NAS signaling connection until the UE is deregistered from a network based on the preference of the UE, UE subscription information, a UE mobility pattern and a network configuration.

The procedure of releasing the NAS signaling connection is initiated by a 5G (R)AN node or the AMF.

When the UE detects the release of an AN signaling connection, the UE determines that the NAS signaling connection has been released. When the AMF detects that N2 context has been released, the AMF determines that the NAS signaling connection has been released.

3) UE Mobility Restriction

A mobility restriction restricts the service access or mobility control of a UE within a 5G system. A mobility restriction function is provided by a UE, an RAN and a core network.

The mobility restriction is applied to only 3GPP access, but is not applied to non-3GPP access.

In the CM-IDLE state and the CM-CONNECTED state accompanied by RRC Inactive, a mobility restriction is performed by a UE based on information received from a core network. In the CM-CONNECTED state, a mobility restriction is performed by an RAN and a core network.

In the CM-CONNECTED state, a core network provides a handover restriction list for a mobility restriction to an RAN.

The mobility restriction includes an RAT restriction, a forbidden area and a service area restriction as follows:

RAT restriction: the RAT restriction is defined as a 3GPP RAT(s) whose access of a UE is not permitted. A UE within a restricted RAT is not allowed to initiate any communication with a network based on subscription information.

Forbidden area: a UE is not allowed to initiate any communication with a network based on subscription information within a forbidden area under a specific RAT.

Service area restriction: it defines an area in which a UE can initiate cannot initiate communication with a network as follows:

Allowed area: if a UE is allowed by subscription information within an allowed area under a specific RAT, the UE is allowed to initiate communication with a network.

Non-allowed area: a service area for a UE is restricted based on subscription information within a non-allowed area under a specific RAT. The UE and the network are not allowed to initiate session management signaling for obtaining a service request or user service (both the CM-IDLE state and the CM-CONNECTED state). The RM procedure of the UE is the same as that in the allowed area. A UE within a non-allowed area responds to the paging of a core network as a service request.

In a specific UE, a core network determines a service area restriction based on UE subscription information. Optionally, an allowed area may be fine-tuned by a PCF (e.g., based on a UE location, a permanent equipment identifier (PEI) or a network policy). The service area restriction may be changed due to subscription information, a location, a PEI and/or a policy change, for example. The service area restriction may be updated during a registration procedure.

If a UE has an RAT restriction, a forbidden area, an allowed area, a non-allowed area or an area overlapping between them, the UE performs an operation according to the following priority:

The evaluation of the RAT restriction has precedence over the evaluation of any other mobility restriction;

The evaluation of the forbidden area has precedence over the evaluation of the allowed area and the non-allowed area; and The evaluation of the non-allowed area has precedence over the evaluation of the allowed area.

4) Mobile Initiated Connection Only (MICO) Mode

A UE may indicate the preference of the MICO mode during initial registration or registration update. The AMF determines whether the MICO mode is permitted for the UE based on a local configuration, the preference indicated by the UE, UE subscription information and a network policy or a combination of them, and notifies the UE of the results during a registration procedure.

A UE and a core network re-initiates or exits from the MICO mode in the following registration signaling. If the MICO mode is not clearly indicated within a registration procedure and a registration procedure is successfully completed, the UE and the AMF do not use the MICO mode. That is, the UE operates as a general UE, and the network also treats a corresponding UE as a general UE.

The AMF allocates a registration area to a UE during a registration procedure. When the AMF indicates the MICO mode for the UE, the registration area is not restricted as a paging area size. If the AMF serving area is the whole PLMN, the AMF may provide the UE with the "whole PLMN" registration area. In this case, re-registration with the same PLMN attributable to mobility is not applied. If a mobility restriction is applied to a UE in the MICO mode, the AMF allocates an allowed area/non-allowed area to the UE.

When the AMF indicates the MICO mode for the UE, the AMF considers that the UE is always unreachable during the CM-IDLE state. The AMF rejects any request for downlink data transfer for a corresponding UE that is in the MICO mode and the CM-IDLE state. The AMF also delays downlink transport, such as SMS or location service through the NAS. A UE in the MICO mode may be reachable for mobile-terminated data or signaling only when the UE is in the CM-CONNECTED mode.

The AMF may provide an RAN node with pending data indication when a UE in the MICO mode can immediately transport mobile-terminated data and/or signaling when the UE switches to the CM-CONNECTED mode. When the RAN node receives the indication, the RAN node considers the information when it determines user inactivity.

A UE in the MICO mode does not need to listen to paging during the CM-IDLE state. The UE in the MICO mode may stop any AS procedure within the CM-IDLE state until it starts switching from the CM-IDLE to the CM-CONNECTED mode due to one of the following reasons.

If a change (e.g., configuration change) within the UE requires registration update to a network
If a periodic registration timer expires
If MO data is pending
If MO signaling is pending Quality of Service (QoS) Model QoS is a technology for the smooth transfer service of various traffic (mail, data transmission, audio and video) to a user depending on each character.

A 5G QoS model supports a framework-based QoS flow. The 5G QoS model supports both a QoS flow that requires a guaranteed flow bit rate (GFBR) and a QoS flow that does not require the GFBR.

The QoS flow is the finest granularity for QoS classification in a PDU session.

A QoS flow ID (QFI) is used to identify a QoS flow within a 5G system. The QFI is unique within a PDU session. User plane traffic having the same QFI within a PDU session receives the same traffic transfer processing (e.g., scheduling and an admission threshold). The QFI is transferred within an encapsulation header on N3 (and N9). The QFI may be applied to a different payload type of a PDU (i.e., an IP packet, unstructured packet and Ethernet frame).

In this specification, for convenience of description, "QoS" and a "QoS flow" are interchangeably used. Accordingly, in this specification, "QoS" may be construed as meaning a "QoS flow", and "QoS" may be construed as meaning a "QoS flow."

Within a 5G system, QoS flows may be controlled by an SMF upon PDU session setup or QoS flow establishment/modification.

If applicable, all of QoS flows have the following characteristics:

QoS profile previously configured in the AN or provided from the SMF to the AN via the AMF through the N2 reference point;
One or more networks provided from the SMF to the UE via the AMF through the N1 reference point—provided QoS rule(s) and/or one or more UE-derived QoS rule(s)
SDF classification provided from the SMF to the UPF through the N4 reference point and QoS-related information (e.g., session-aggregate maximum bit rate (AMBR)).

The QoS flow may become a "guaranteed bit rate (GBR)" or a "non-guaranteed bit rate (non-GBR)" depending on the QoS profile. The QoS profile of the QoS flow includes the following QoS parameters:

i) With respect to each of QoS flows, QoS parameters may include the followings:

5G QoS indicator (5QI): the 5QI is a scalar for referring to 5G QoS characteristics (i.e., control QoS transfer handling access node-specific parameters for a QoS flow, for example, scheduling weight, an admission threshold, a queue management threshold and a link layer protocol configuration).

Allocation and retention priority (APR): the ARP includes a priority level, a pre-emption capability and pre-emption vulnerability. The priority level defines the relative importance of a resource request. This is used to determine whether a new QoS flow will be accepted or rejected if resources are restricted and to used to determine whether the existing QoS flow will pre-empt resources while the resources are restricted.

ii) Furthermore, only in the case of each GBR QoS flow, QoS parameters may further include the followings:

GFBR—the uplink and downlink;
Maximum flow bit rate (MFBR)—the uplink and downlink; and
Notification control.

iii) Only in the case of a non-GBR QoS flow, QoS parameters may further include the following: Reflective QoS attribute (RQA)

There are supported methods of controlling the following QoS flows:

1) In the case of the non-GBR QoS flow: if a standardized 5QI or a previously configured 5QI is used, a 5QI value is used as the QFI of the QoS flow and a default ARP is previously configured in the AN;

2) In the case of the GBR QoS flow: if a standardized 5QI or a previously configured 5QI is used, a 5QI value is used as the QFI of the QoS flow. A default ARP is transmitted to the RAN when a PDU session is established. Whenever the NG-RAN is used, the user plane (UP) of the PDU session is activated;

3) In the case of the GBR and non-GBR QoS flow: an allocated QFI is used. A 5QI value may be standardized, previously configured or not standardized. The QoS profile and QFI of the QoS flow may be provided to the (R)AN through N2 when a PDU session is established or when a QoS flow is established/changed. Whenever the NG-RAN is used, the user plane (UP) of the PDU session is activated.

A UE may perform the marking and classification (i.e., the association of UL traffic for a QoS flow) of UL user plane traffic based on a QoS rule. Such rules may be explicitly provided to the UE (when a PDU session is established or a QoS flow is established) or may have been previously configured in the UE or may be implicitly derived by the UE by applying reflective QoS.

The QoS rule may include a unique QoS rule ID within a PDU session, the QFI of an associated QoS flow, and one or more packet filters and precedence value. Additionally, with respect to an allocated QFI, the QoS rule may include QoS parameters related to a UE. One or more QoS rules associated with the same QoS flow (i.e., having the same QFI) may be present.

The default QoS rule may be necessary for all of PDU sessions. The default QoS rule may be a unique QoS rule of a PDU session that may not include a packet filter (In this case, the highest precedence value (i.e., the lowest priority) must be used). If the default QoS rule does not include a packet filter, the default QoS rule defines the processing of packets not matched with another QoS rule in a PDU session.

The SMF performs binding between SDFs for a QoS flow depending on the QoS of an SDF and service requirements. The SMF allocates a QFI to a new QoS flow, and derives the QoS parameter of the new QoS flow from information provided by the PCF. If applicable, the SMF may provide an (R)AN with a QFI along with a QoS profile. The SMF provides an SDF template (i.e., a set of packet filters associated with the SDF received from the PCF) along with SDF priority, QoS-related information and corresponding packet marking information (i.e., a QFI, a differentiated services code point (DSCP) value and optionally enables the classification, bandwidth application and marking of user plane traffic using reflective QoS indication for a UPF). If applicable, the SMF generates QoS rule(s) for a PDU session by allocating unique QoS rule IDs within a PDU session to which the QFI of a QoS flow has been added, configuring packet filter(s) for the UL part of the SDF template, and setting QoS rule priority in the SDF priority. The QoS rule is provided to a UE that enables the classification and marking of UL user plane traffic.

Figure 12:
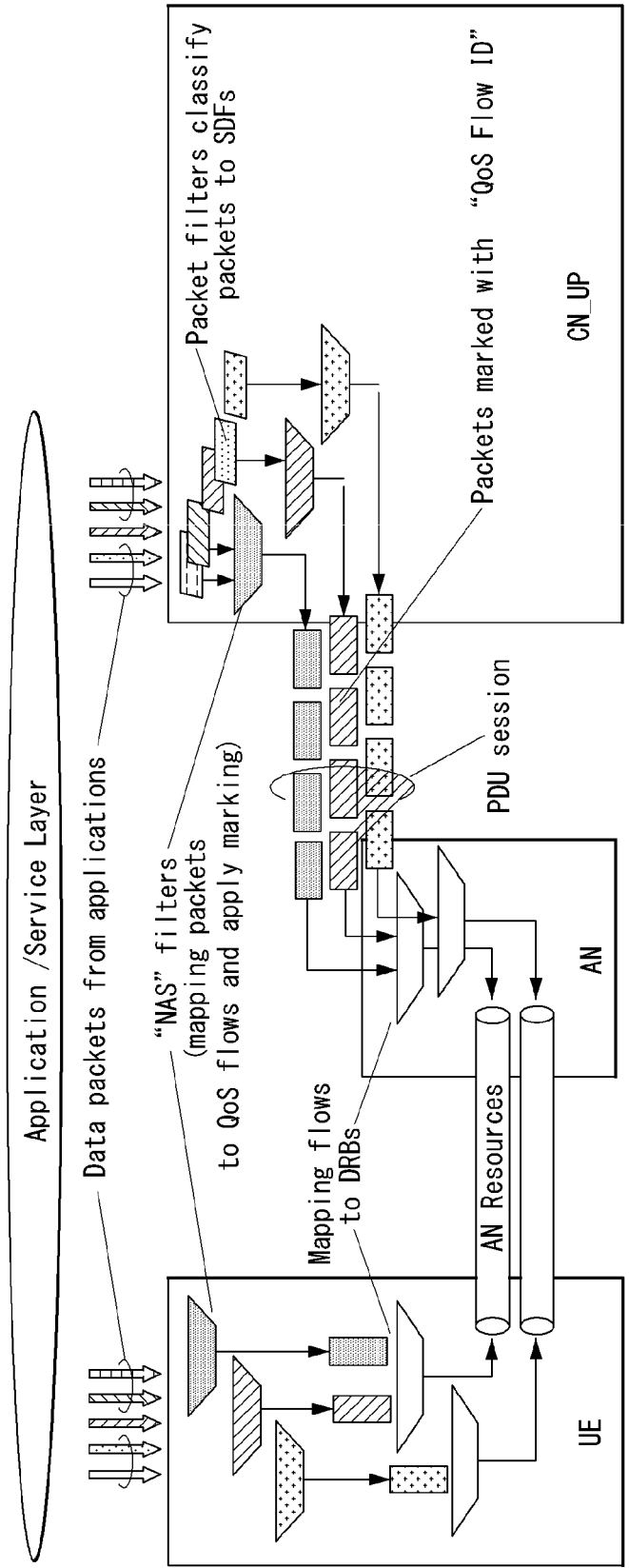
FIG. 12 illustrates classification and user plane marking for a QoS flow and the mapping of a QoS flow to AN resources according to an embodiment of the present invention.

FIG. 12 illustrates classification and user plane marking for a QoS flow and the mapping of a QoS flow to AN resources according to an embodiment of the present invention.

1) Downlink

An SMF allocates a QFI for each QoS flow. Furthermore, the SMF derives QoS parameters from information provided by a PCF.

The SMF provides an (R)AN with the QFI along with a QoS profile including the QoS parameters of a QoS flow. Furthermore, when a PDU session or QoS flow is established, the QoS parameters of the QoS flow is provided to the (R)AN as the QoS profile through N2. Furthermore, whenever an NG-RAN is used, a user plane is activated. Furthermore, QoS parameters may be previously configured in the (R)AN for a non-GBR QoS flow.

Furthermore, the SMF provides an UPF with an SDF template (i.e., a set of packet filters associated with the SDF received from the PCF) along with SDF preference and a corresponding QFI so that the UPF can perform the classification and marking of a downlink user plane packet.

Downlink inflow data packets are classified based on the SDF template according to the SDF preference (without the initiation of additional N4 signaling). A CN classifies user plane traffic belonging to a QoS flow through N3 (and N9) user plane marking using the QFI. The AN binds the QoS flow with AN resources (i.e., a DRB in the case of the 3GPP RAN). In this case, a relation between the QoS flow and the AN resources is not restricted to 1:1. The AN may configure the AN resources necessary to map a QoS flow to a DRB so that a UE may receive the QFI (and reflective QoS may be applied).

If matching is not discovered, when all of QoS flows are related to one or more DL packet filters, the UPF may discard a DL data packet.

Characteristics applied to process downlink traffic are as follows:

The UPF maps user plane traffic to the QoS flow based on the SDF template.

The UPF performs session-AMBR execution and performs PDU counting for charging support.

The UPF may transmit the PDUs of a PDU session in a single tunnel between 5GC and the (A)AN, and the UPF may include the QFI in an encapsulation header.

The UPF performs transmission level packet marking in the downlink (e.g., sets DiffServ code in an outer IP header). Transmission level packet marking is based on 5QI and the ARP of an associated QoS flow.

The (R)AN maps PDUs from a QoS flow to access-specific resources based on a QFI, related 5G QoS characteristics and parameters by considering an N3 tunnel associated with a downlink packet.

If reflective QoS is applied, a UE may generate a new derived QoS rule (or may be called a "UE-derived QoS rule"). A packet filter within the derived QoS rule may be derived from a DL packet (i.e., the header of the DL packet). The QFI of the derived QoS rule may be configured depending on the QFI of the DL packet.

2) Uplink

The SMF generates QoS rule(s) for a PDU session by allocating a QoS rule ID, adding the QFI of a QoS flow, setting packet filter(s) in the uplink part of an SDF template, and setting QoS rule precedence in SDF precedence. The SMF may provide a UE with the QoS rules in order for the UE to perform classification and marking.

The QoS rule includes a QoS rule ID, the QFI of a QoS flow, one or more packet filters and preference values. The same QFI (i.e., the same QoS flow) and one or more QoS rules may be associated.

A default QoS rule is required for each PDU session. The default QoS rule is the QoS rule of a PDU session not including a packet filter (In this case, the highest precedence value (i.e., the lowest priority) is used). If the default QoS rule does not include a packet filter, the default QoS rule defines the processing of a packet not matched with any another QoS rule within the PDU session.

The UE performs the classification and marking of uplink user plane traffic. That is, the UE associates uplink traffic with the QoS flow based on the QoS rule. The rule may be explicitly signaled through N1 (when a PDU session is established or when a QoS flow is established or may be previously configured in the UE or may be implicitly derived by the UE from reflected QoS.

In the UL, the UE evaluates an UL packet with respect to the packet filter of the QoS rule based on the precedence value of the QoS rule (i.e., in order of increasing precedence value) until a matching QoS rule (i.e., the packet filter is matched with the UL packet) is discovered. The UE binds the UL packet to the QoS flow using a QFI in the corresponding matching QoS rule. The UE binds the QoS flow and the AN resources.

If matching is not discovered and a default QoS rule includes one or more UL packet filters, the UE may discard an UL data packet.

Characteristics applied to process uplink traffic are as follows:

- A UE may use stored QoS rules in order to determine mapping between UL user plane traffic and a QoS flow. The UE may mark an UL PDU with the QFI of a QoS rule including a matching packet filter, and may transmit the UL PDU using corresponding access-specific resources for a QoS flow based on mapping provided by an RAN.
- The (R)AN transmits the PDU through an N3 tunnel with respect to an UPF. When an UL packet passes through a CN from the (R)AN, the (R)AN includes a QFI in the encapsulation header of the UL PDU and selects the N3 tunnel.
- The (R)AN may perform transmission level packet marking in the uplink. The transmission level packet marking may be based on the ARP of a QoS flow associated with a 5QI.
- A UPF checks whether the QFIs of UL PDUs are provided to the UE or are aligned (e.g., in the case of reflective QoS) with QoS rules implicitly derived by the UE.
- The UPF performs session-AMBF execution and counts a packet for charging.

In the case of an UL classifier PDU session, UL and DL session-AMBRs need to be performed on an UPF that supports an UL classifier function. Furthermore, the DL session-AMBR needs to be separately performed in all of UPFs that terminate an N6 interface (i.e., an interaction between UPFs is not required).

In the case of a multi-home PDU session, UL and DL session-AMBRs are applied to an UPF that supports a branch point function. Furthermore, the DL session-AMBR needs to be separately performed in all of UPFs that terminate the N6 interface (i.e., an interaction between UPFs is not required).

The (R)AN needs to perform a maximum bit rate (UE-AMBR) restriction in the UL and DL for each non-GBR QoS flow. When the UE receives a session-AMBR, it needs to perform a PDU session-based UL rate restriction for non-GBR traffic using the session-AMBR. The rate restriction execution for each PDU session is applied to a flow that does not require a guaranteed flow bit rate. The MBR per SDF is mandatory to a GBR QoS flow, but is optional for a non-GBR QoS flow. The MBR is performed in the UPF.

QoS control for an unstructured PDU is performed in a PDU session level. When the PDU session is established for the transmission of the unstructured PDU, the SMF provides the UPF and the UE with a QFI to be applied to any packet of the PDU session.

Reflective QoS

Reflective QoS means a method for a UE to determine a QoS flow of the uplink corresponding to the downlink by reflecting a QoS flow of the downlink.

The support of reflective QoS through an AN is under 5GC control. Reflective QoS may be achieved by generating a QoS rule derived based on downlink traffic received by a UE. Reflective QoS and non-reflective QoS may be applied at the same time within the same PDU session. In the case of traffic influenced by reflective QoS, an UL packet may obtain the same QoS marking as that of a reflected DL packet.

In the case of a UE supporting a reflective QoS function, if the reflective QoS function is controlled by 5GC with respect to some traffic flows, the corresponding UE may generate a (derived) QoS rule for uplink traffic based on received downlink traffic. Furthermore, the UE may use the (derived) QoS rule to determine mapping between the uplink traffic and a QoS flow. Accordingly, in accordance with reflective QoS, although a UE does not separately receive a QoS rule for determining a QoS flow of the uplink from a network, the UE may autonomously generate a QoS rule based on the QoS flow of the downlink and determine a QoS flow of the uplink corresponding to the downlink (i.e., determines mapping between uplink traffic and the QoS flow).

The derived QoS rule of the UE may include the following parameters:

(UL) packet filter

QFI

Precedence value

The (UL) packet filter may be derived based on a received DL packet and may be used to filter/distinguish UL packets/traffic to which the derived QoS rule will be applied. The UE may filter/distinguish UL packets/traffic to which the derived QoS rule will be applied by applying an (UL) packet filter, and may perform QoS marking on the filtered/distinguished UL packet using a QFI.

A UE not supporting reflective QoS needs to neglect the indication of reflective QoS.

When reflective QoS is activated through a user plane, a precedence value for all of derived QoS rules may be set as a standardized value. If reflective QoS is activated through a control plane (i.e., a QoS flow, a PDU session), a precedence value for a derived QoS rule within the range of control plane activation may be set as a signaled value through the control plane.

If user plane reflective QoS is available by 5GC, the UPF may include a reflective QoS indication (RQI) indicative of the activation of reflective QoS in an encapsulation header (may be referred to as an "NG3 (encapsulation) header") through an N3 reference point along with a QFI.

Reflective QoS may be activated through a user plane and a control plane. 5GC may determine whether reflective QoS will be activated through the control plane or will be activated through the user plane based on an access type and policy.

If 5GC has determined reflective QoS activation through the user (U) plane, the SMF may include a QoS rule (or transmit it to the UPF) including an indication indicating that the reflective QoS must be activated by reflecting the user plane. If the UPF is matched with the QoS rule and a DL packet including the indication indicative of the activation of the reflective QoS is received, the UPF may include an RQI in the encapsulation header of the N3 reference point. Reflective QoS activation through the user plane may be used to avoid out-of-band signaling (e.g., signaling through a non-3GPP access network).

If 5GC has determined reflective QoS activation through the control (C) plane, the SMF may include the RQI in the QoS rule transmitted to the UE through the N1 interface. If the UE receives a DL packet matched with the QoS rule including the RQI, the UE may generate a UE-derived QoS rule.

Furthermore, 5GC may also support the inactive function of reflective QoS.

Reflective QoS support through the RAN under the control of a network: the network determines QoS to be applied to DL traffic, and a UE reflects the DL QoS in associated UL traffic. When the UE receives a DL packet to which reflective QoS must be applied, the UE generates a new implicit QoS rule. The implicit QoS rule may be referred to as a "derived QoS rule" in this specification. The packet filter of the implicit QoS rule is derived from the header of the DL packet. Reflective QoS indication may be signaled or may not be signaled through a control (C)-plane or inband. The implicit rule (derived through reflective QoS) may have higher or lower priority than the explicitly signaled QoS rule.

As may be seen from the above contents, a method of indicating reflective QoS includes i) a method of explicitly transmitting signaling, ii) an inband method of transmitting data marked with the indication of reflective QoS, and iii) a method for a UE to directly detect reflective QoS without any signaling/marking.

Prior to a more detailed description of such a reflective QoS indication method, a network structure and a bearer mapping method for uplink traffic to which the present invention may be applied are first described.

Figure 13:
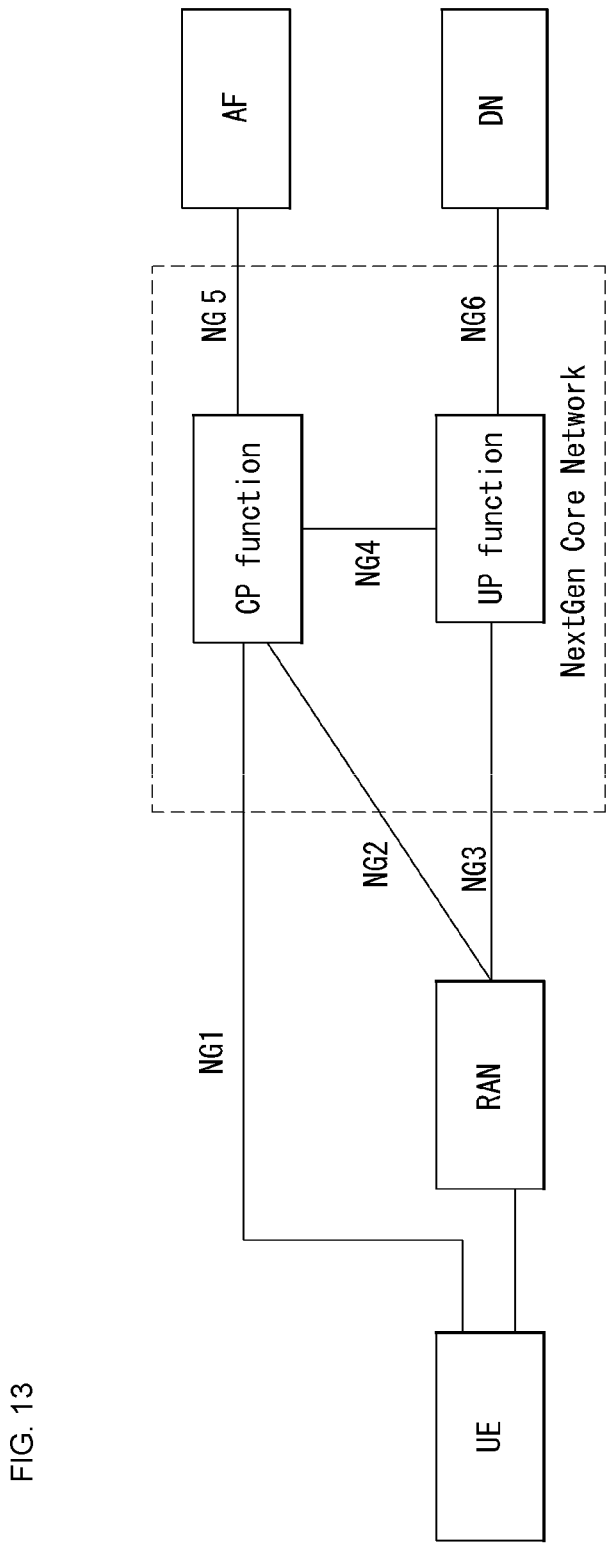
FIG. 13 is a diagram illustrating 5G system architecture to which the present invention may be applied.

FIG. 13 is a diagram illustrating 5G system architecture to which the present invention may be applied. This drawing is a more simplified drawing of FIG. 6. The description described in FIG. 6 may be identically applied.

Referring to FIG. 13, the 5G system architecture may include various elements (i.e., network functions (NF)). This drawing illustrates an application function (AF), a data network (DN), a user plane function (UPF), a control plane function (CPF), a (radio) access network ((R)AN), and a user equipment (UE) corresponding to some of the various elements.

In a 3GPP system, a conceptual link that connects NFs within a 5G system is defined as a reference point. The following illustrates reference points included in the 5G system architecture represented in this drawing.

Figure 14:
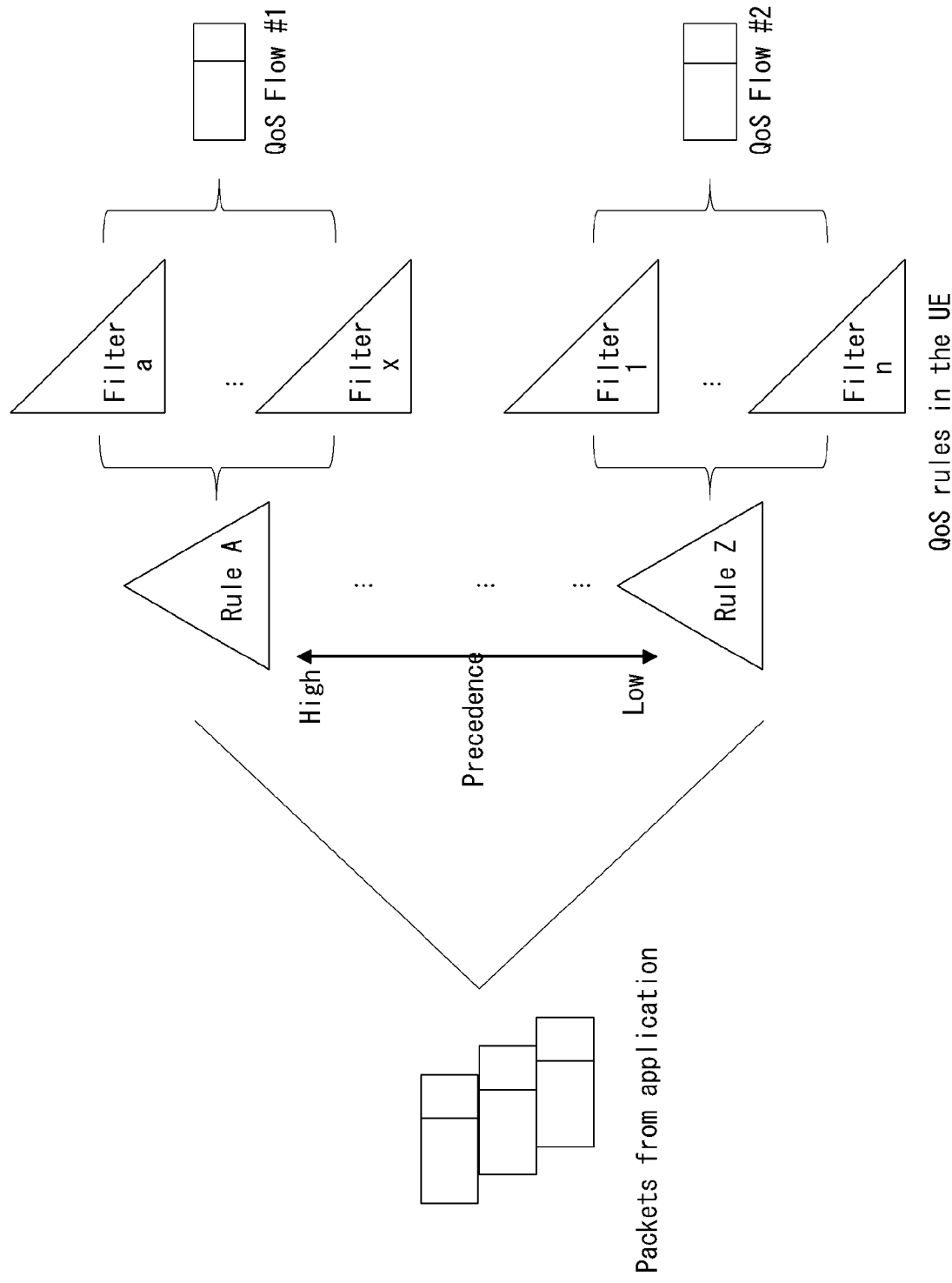
FIG. 14 illustrates a QoS flow mapping method for uplink traffic of a UE to which the present invention may be applied.

NG1: a reference point between the UE and the CPF
NG2: a reference point between the (R)AN and the CPF
NG3: a reference point between the (R)AN and the UPF
NG4: a reference point between the UPF and the CPF
NG5: a reference point between the CPF and the AF
NG6: a reference point between the UPF and the DN FIG. 14 illustrates a QoS flow mapping method for uplink traffic of a UE to which the present invention may be applied.

Referring to FIG. 14, a UE routes uplink packets to different QoS flows based on a packet filter allocated to a QoS rule. The UE preferentially evaluates the uplink packet filter of the QoS rule having the lowest evaluation priority index with respect to matching. If matching is not discovered, the UE performs the evaluation of a packet filter present in the QoS rule in increasing order of evaluation priority index. This procedure needs to be executed until matching is discovered or until packet filters present in all of QoS rules are evaluated. If matching is discovered, the uplink data packet is transmitted through a QoS flow determined by a matched QoS rule. If matching is not discovered, the uplink data packet needs to be transmitted through a QoS flow to which any uplink packet filter has not been allocated. If one or more uplink packet filters are allocated to all of QoS rules, the UE must discard the uplink data packets.

In 5G, unlike in EPC, a bearer for QoS is not separately produced, but an UP function performs QoS marking (operation of marking/indicating a QFI) on an NG3 header according to a rule transmitted by a CP function. A method of providing QoS based on the QoS marking has been described above. In the case of reflective QoS, when the UP function provides a UE with indication to use reflective QoS, the UE may generate an uplink (packet) filter based on a downlink data packet (or traffic), and may produce an (uplink QoS) rule for marking the same QoS marking as that of a downlink data packet (or traffic) in an uplink data packet (or traffic) using the generated uplink (packet) filter. In this case, the CP function can support the uplink QoS of the UE without directly indicating a rule for the uplink in the UE.

In accordance with such reflective QoS, there is an effect in that the CP function can simply support the uplink QoS of a UE through only indication to apply reflective QoS without directly providing a QoS rule with respect to temporarily generated data. In this case, if such reflective QoS is used, there is a problem in that the UE continues to generate and store a (derived) QoS rule in order to support the reflective QoS. As the number of (derived) QoS rules that need to be managed/stored by the UE is increased, the UE's overhead is increased and a data processing speed is reduced because the number of (derived) QoS rules that must be checked by the UE until a default QoS rule is applied is increased.

Accordingly, this specification proposes a method of discarding/deleting, by a network node, a QoS rule generated (derived) by a UE for reflective QoS by providing a reflective QoS use timer value when the timer expires (expire), while the network node provides signaling for reflective QoS to the UE. A method of indicating reflective QoS basically includes three methods to be described later. Such a timer concept may be applied to Method 1 and Method 2 of the three methods.

Reflective QoS may be indicated in a UE through C-plane signaling (method 1), inband signaling (method 2), and non-signaling method (method 3).

1. The method 1 is a method for a network node to indicate Reflective QoS through C-plane signaling. That is, this method is a method of directly indicating (i.e., explicitly indicating reflective QoS through control signaling), by a CP function, with respect to a UE so that QoS (or QoS flow) is identically used/configured between a downlink (flow) and a corresponding uplink (flow) through control signaling (e.g., this method is used if QoS control for an uplink data packet whose source-destination addresses are exchanged with a downlink data packet is necessary). The method 1 has a small signaling message size because it is not necessary for the CP function to directly transfer filter information for the uplink and QoS information (e.g., QFI information) to a UE, but has a disadvantage in that separate (control) signaling is generated.

2. The method 2 is a method for a network node to indicate reflective QoS through inband signaling. In accordance with the method 2, a network node may transmit an indicator indicating whether reflective QoS must be applied along with QoS marking in an NG3 (encapsulation) header or a radio header while transmitting data. Accordingly, the method 2 has an advantage in that reflective QoS can be indicated/applied even without additional (control) signaling, but has a disadvantage in that additional information must be added to the NG3 (encapsulation) header or a radio header. Accordingly, there may be a problem in that indication for reflective QoS is also lost when a data loss according to congestion is generated in a process for a network node to transmit data to a UE.

3. In the method 3, a network node does not transmit any signaling related to reflective QoS, and may autonomously determine that a UE does not have QoS information (e.g., information about a QoS flow, QFI) about an uplink flow mapped to the downlink and may apply the reflective QoS. In the case of the method 3, there is no signaling overhead, but there is no margin that a default QoS (rule) may be applied to the uplink. In a conventional technology, when an uplink flow is generated, a default QoS (Rule) was applied if a TFT suitable for the uplink flow is not present. In accordance with the method 3, however, not a default QoS (rule), but reflective QoS is applied. Accordingly, unconditional reflective QoS is applied to a (uplink) flow mapped to a downlink, and it is difficult to support QoS by separating the uplink and the downlink. In order to support this, separate QoS rule update through explicit signaling must be performed.

In a process of producing a PDU session, the CP function may determine that reflective QoS will be indicated using which method. The CP function may determine whether reflective QoS will be used, a reflective QoS activation indication method and/or a deactivation indication method if the reflective QoS is used, based on reflective QoS capability information (e.g., a user plane activation capability, a control plane activation capability, a user plane deactivation capability, a control plane deactivation capability), an operator policy, information (e.g., an APN/DNN and a PDU type) about a PDU session, subscription information, etc., transmitted by a UE.

For example, in order to reduce control plane signaling, the CP function may determine a user plane activation/deactivation method (i.e., a reflective QoS activation/deactivation indication method through the user plane) as the reflective QoS activation/deactivation method. The CP function may indicate whether determined reflective QoS will be used, a reflective QoS activation method and/or reflective QoS deactivation method with respect to a UE. The UE may determine whether reflective QoS will be used/activated based on the reflective QoS-related information received from the CP function. The reflective QoS-related information from the CP function may be transmitted to the UE through a PDU session accept message. In this case, the UE may determine whether the reflective QoS will be used based on the received PDU session accept message, and an embodiment related to it is described hereinafter in connection with FIG. 15.

If the method 1 is used, the UE may apply reflective QoS to an (uplink) flow indicated by corresponding signaling if there is explicit signaling from the CP function. If the method 2 is used, the UE may monitor the header of a downlink data packet and apply reflective QoS to a specific/indicated (IP/QoS/uplink) flow if reflective QoS (indication) is marked in the corresponding header. If the method 3 is used, the UE may apply reflective QoS to uplink flow/data/traffic mapped to a received downlink flow/data/traffic regardless of a reflective QoS (indication) mark within the head of a downlink data packet.

If it is determined that reflective QoS is not used, the UE may determine QoS (flow) of the uplink based on only a current QoS rule without the need to determine whether reflective QoS will be applied/used by monitoring the header of downlink data.

In the reflective QoS activation method, whether the control plane will be used or the user plane will be used may be determined based on subscription information or the capability of a UE. For example, in order to use the user plane activation method as the reflective QoS activation method, the AS layer of the UE needs to check whether reflective QoS indication is present by continuing to monitor a packet. Such an operation may be a burden on a simple UE, such as Internet of Things (IoT), or a UE that must operate with low power. Accordingly, with respect to the corresponding UE, the user plane activation method may not be determined as a reflective QoS activation method.

The reflective QoS deactivation method may be differently determined independently/regardless of a reflective QoS activation method. For example, reflective QoS has been activated through the user plane, but may be deactivated through the control plane. In order to support the deactivation method through the user plane, a UE may receive indication to use the user plane deactivation method from a network and may drive a timer if reflective QoS indication is present in data (or a data packet). Accordingly, in the case of the user plane deactivation method, a network node must explicitly transmit reflective QoS indication to a UE so that the UE can drive a timer. If reflective QoS is activated through the control plane, the UE may not set the timer. In this case, the UE cannot perform the reflective QoS deactivation method through the user plane.

Figure 15:
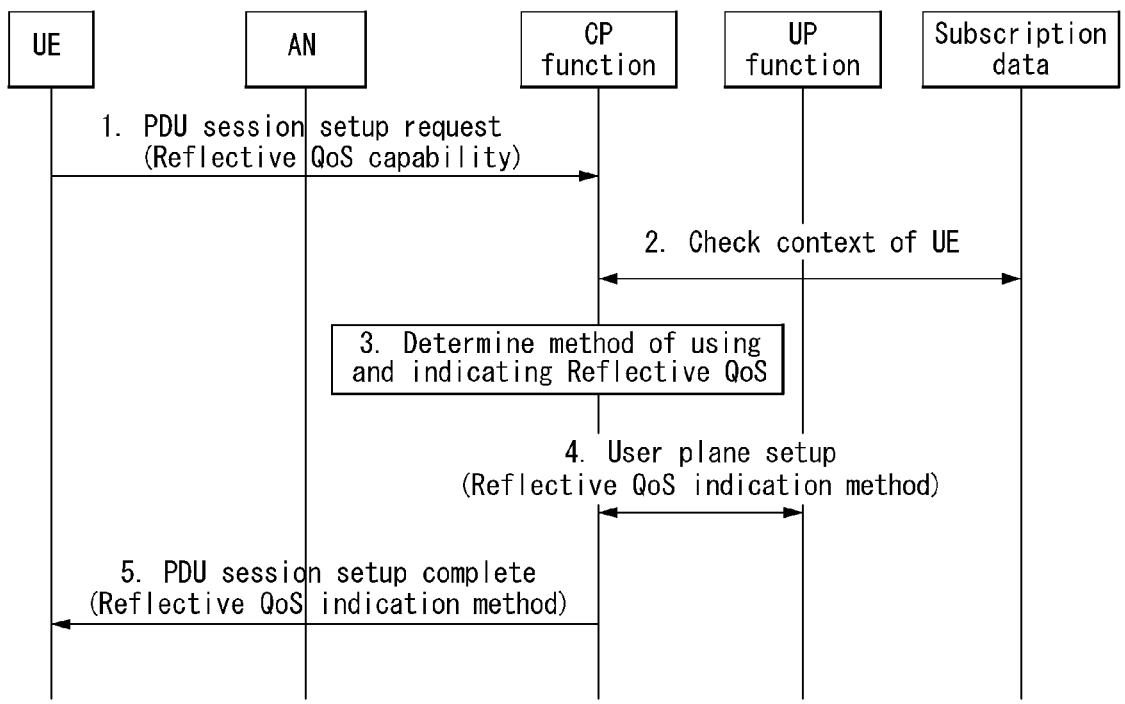
FIG. 15 is a flowchart illustrating a method of determining whether reflective QoS will be used and a reflective QoS indication method in a process of setting up a PDU session according to an embodiment of the present invention.

FIG. 15 is a flowchart illustrating a method of determining whether reflective QoS will be used and a reflective QoS indication method in a process of setting up a PDU session according to an embodiment of the present invention. In this specification, the PDU session setup procedure for producing a PDU session may be referred to as a PDU session establishment procedure.

1. A UE may transmit a PDU session setup request message to a CP function. In this case, the PDU session setup request message may have included reflective QoS capability information regarding whether the UE can perform the reflective QoS.

2. The CP function may check context information of the UE in subscription data.

3. The CP function may determine whether reflective QoS will be used and a reflective QoS indication method for the UE if the reflective QoS is used.

4. The CP function and an UP function may set up a user plane. The reflective QoS indication method determined by the CP function in step 3 may be shared with the UP function.

5. The CP function may transmit a PDU session setup complete message to the UE as a response to the PDU session setup request message. In this case, the PDU session setup complete message may have included information about a reflective QoS indication method.

Referring to the flowchart of FIG. 15, after checking the context of the UE in step 26, a network node (e.g., the CP function) determines whether reflective QoS will be used and a reflective QoS indication method if the reflective QoS is used, based on reflective QoS capability information, session information and/or subscription information of the UE received from the UE in step 1. In step 4, the CP function may notify the UP function of whether reflective QoS will be used and the reflective QoS use method for the PDU session. In step 5, the CP function may notify the UE of whether reflective QoS will be used and/or the reflective QoS indication method.

The aforementioned methods 1 to 3 are described in more detail below with reference to respective drawings.

Figure 16:
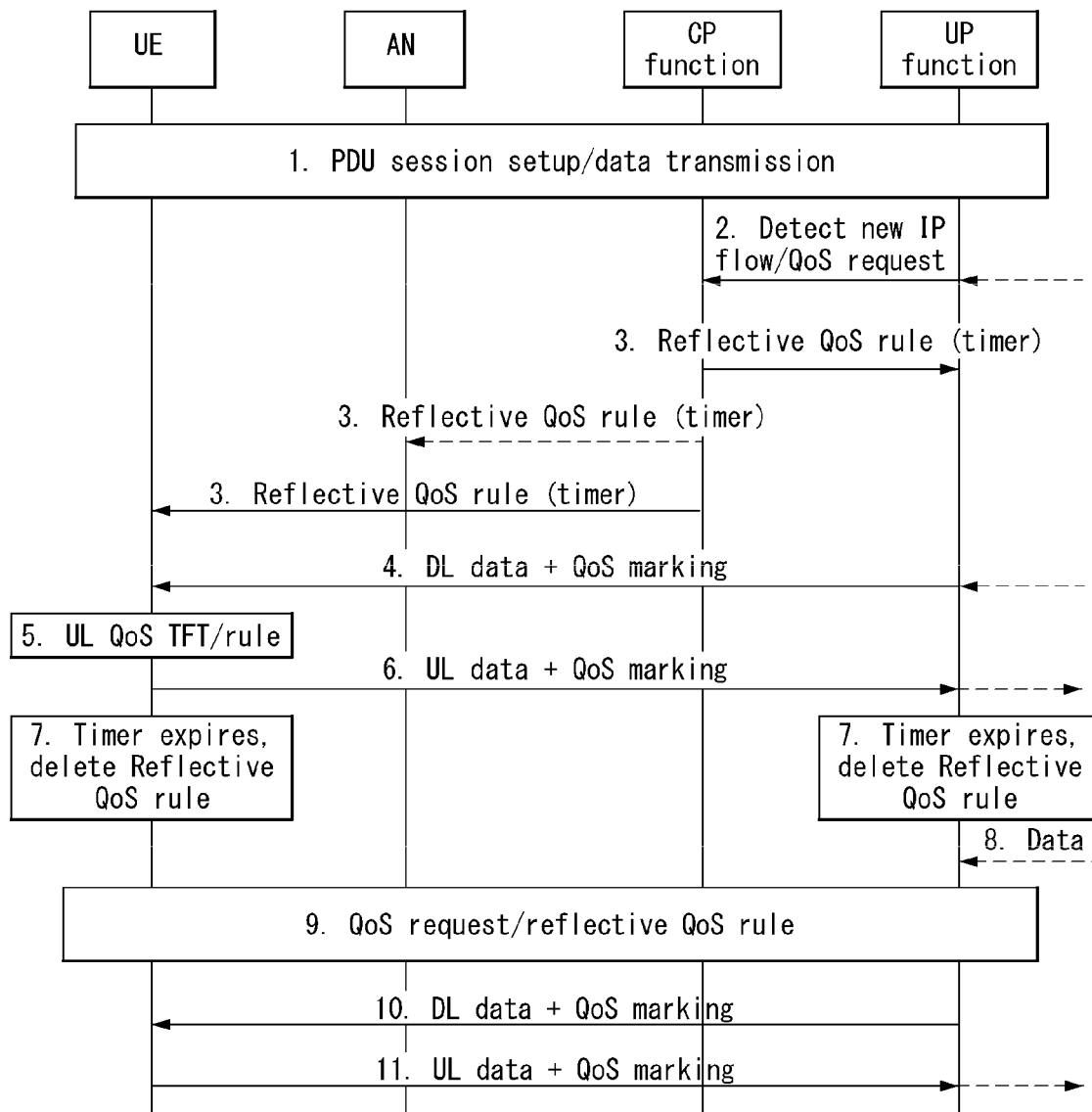
FIG. 16 is a flowchart illustrating a reflective QoS indication method according to a method 1 of the present invention.

Ga. Method 1: method of directly indicating reflective QoS with respect to UE through signaling FIG. 16 is a flowchart illustrating a reflective QoS indication method according to the method 1 of the present invention. In relation to this flowchart, the description of the method 1 described above may be applied identically/similarly, and a redundant description thereof is omitted.

1. A UE may set up a PDU session and transmit/receive data to/from a network node(s) based on the QoS rule received in the PDU session setup process (refer to FIG. 15).

2. If a UP function discovers a new IP flow (may be applied to the case of a non-IP flow), the UP function may notify a CP function that the new flow has been generated/discovered and request corresponding QoS to the CP function.

3. The CP function may transmit both a DL QoS rule and UL QoS rule for the corresponding IP flow to the UP function (and/or transmit only the DL QoS rule to the UP function, and the UP function may directly generate/derive the UL QoS rule based on the DL QoS rule by checking reflective QoS indication) while transmitting QoS (to the CP function, the UE and/or the AN) with respect to the corresponding IP flow, and may also transmit the indication of reflective QoS use.

In this case, the DL QoS rule may correspond to a rule which is used to filter a DL data packet (or flow) to which specific QoS will be marked/applied and to perform the QoS marking. The UL QoS rule may correspond to a rule which is used to filter an UL data packet (or flow) to which specific QoS will be marked/applied and to perform the QoS marking.

Furthermore, the CP function may additionally transmit a timer value regarding time when reflective QoS is valid to the UP function. The UP function may use the DL and/or UL QoS rule only until the corresponding timer expires. The UP function may immediately start the timer when the timer is received.

The CP function may indicate IP flow information and timer information to which the reflective QoS will be applied through control signaling (e.g., NAS signaling or AS signaling) with respect to the UE and/or the AN. The UE and/or the AN that have received the IP flow information and timer information may immediate start the timer.

4. The UP function may apply QoS (or QoS marking) based on the rule (e.g., the DL QoS rule and/or the UL QoS rule) produced through the reflective QoS while the reflective QoS is applied to a specific QoS flow indicated by the CP function. This operates in the same manner as that general QoS is applied (or QoS marking) according to a DL QoS rule if there is a (downlink) flow mapped/related to the reflective QoS (i.e., satisfying the DL QoS rule).

5. If the reflective QoS is applied, when the UE receives a downlink data packet/flow in the state in which an RQI has been marked (or reflective QoS is indicated), the UE may generate a derived QoS rule (based on the downlink data packet/flow) for an uplink data packet/flow (or may be abbreviated as an "uplink packet/flow") mapped to the downlink data packet/flow. The UE starts the timer related to the corresponding derived QoS rule.

6. The UE may filter/distinguish the subject on which the QoS marking will be performed by applying the derived QoS rule generated by the reflective QoS rule to the uplink data packets/flows, and may transmit the uplink data packets/flows after performing the QoS marking on the filtered/distinguished uplink data packets/flows. In this case, a QFI used when the QoS marking is performed on the uplink data packets/flows may have been included in the derived QoS rule, and may be the same as a QFI QoS-marked in the downlink data packet/flow.

7. Thereafter, if the timer for a specific derived QoS rule expires, the UE and the UP function may delete the derived QoS rule.

8. Thereafter, a flow corresponding to previously used reflective QoS may reach the UP function.

9. Signaling for reflective QoS, such as that of step 3, may be transmitted/received through the flow detection process of step 2.

10-11. While a corresponding derived QoS rule is valid, the UE and/or the UP function may operate based on the reflective QoS rule according to the present embodiment.

The CP function can prevent a rule (e.g., the DL QoS rule, the UL QoS rule and/or the derived QoS rule) from being deleted/expiring by transmitting a rule/indication for reflective QoS again before the timer expires.

If the method 1 is used, there may be an effect in that there is no restriction to the size of a timer value because the network node directly provides signaling regarding a reflective QoS application, but additional (control) signaling is generated.

Figure 17:
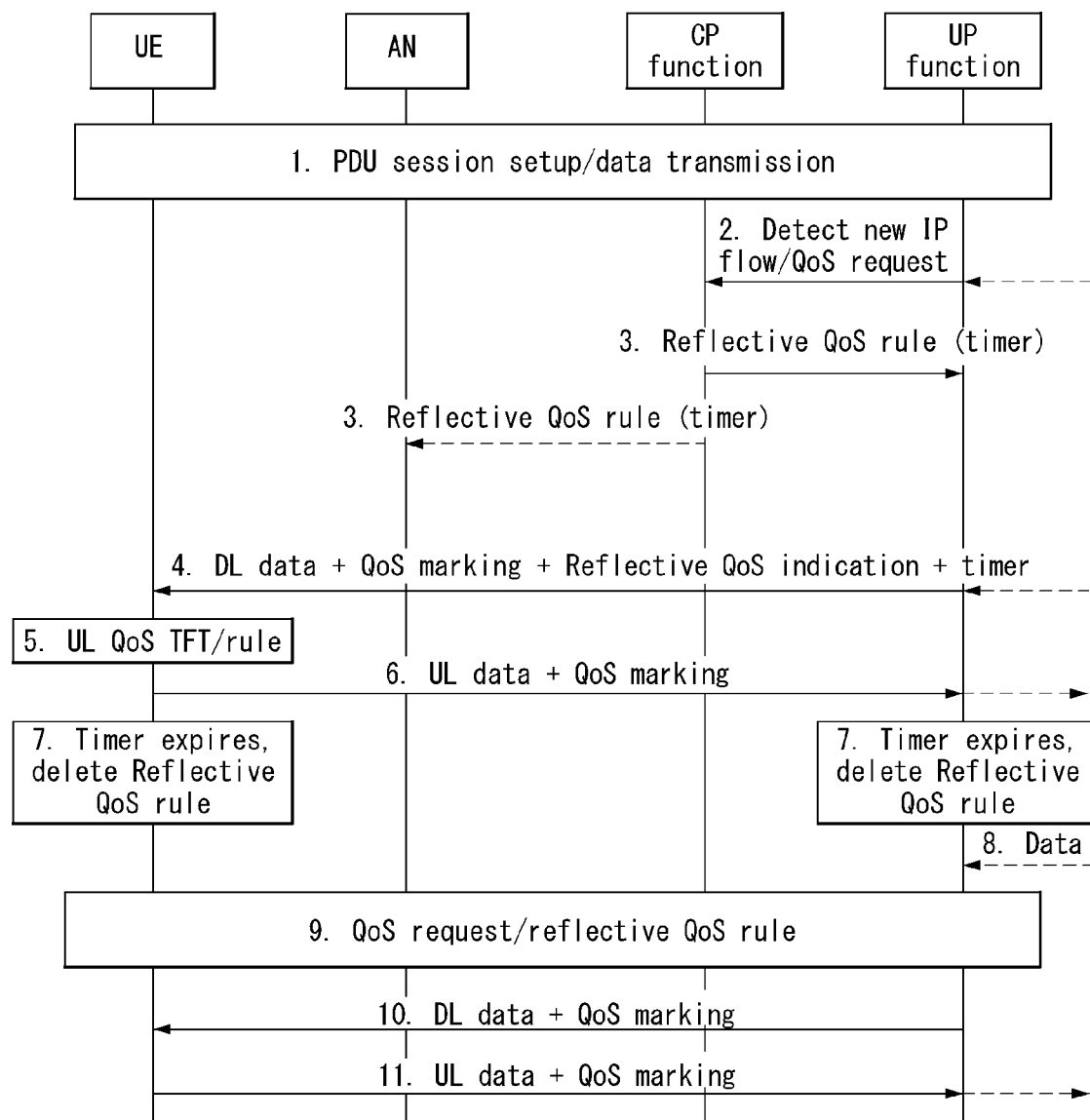
FIG. 17 is a flowchart illustrating a reflective QoS indication method according to a method 2 of the present invention.

Na. Method 2: indication method through inband signaling (packet marking) with respect to a UE FIG. 17 is a flowchart illustrating a reflective QoS indication method according to the method 2 of the present invention. In relation to this flowchart, the description of the aforementioned flowchart of FIG. 16 and the method 2 may be applied identically/similarly, and a redundant description thereof is omitted.

1. A UE may set up a PDU session and may transmit/receive data to/from a network node(s) based on a received QoS rule in the PDU session setup process (refer to FIG. 15).

2. If an UP function discovers a new IP flow (applicable to the case of a non-IP flow), the UP function may notify a CP function that the new flow has been generated/discovered and request corresponding QoS to the CP function.

3. The CP function may transmit QoS information (e.g., the indication of Reflective QoS use, QoS (or a DL/UL QoS rule), information on IP flow to which reflective QoS will be applied and/or timer information) for a corresponding IP flow to the UP function and the AN.

4. The UP function may transmit downlink data, QoS marking (e.g., a QFI), reflective QoS indication (e.g., an RQI) and/or a timer to the UE. In this case, the UP function may apply QoS (or QoS marking) to uplink data based on a rule (e.g., the DL QoS rule and/or the UL QoS rule) produced/received through the reflective QoS during the time when the reflective QoS is applied to a corresponding IP flow. The UP function may start the corresponding timer along with the transmission of the timer.

Referring to steps 3 and 4, the method 2 is different from the method 1 in that the CP function does not directly transmit QoS information to the UE and transmits the QoS information to only the UP function and the AN. Instead, the UP function may transmit marking/indication (i.e., an RQI) indicative of a Reflective QoS application and the timer to the UE in an NG3 header as QoS information in addition to the QoS marking while transmitting downlink data. In this specification, for convenience of description, downlink data and QoS-related information may be expressed as being transmitted through a "downlink data packet/flow." Such a "downlink data packet/flow" may be abbreviated as a "downlink packet."

5. The UE that has received the QoS information may produce a derived QoS rule based on the downlink data packet/flow and use/apply the derived QoS rule. In this case, the UE may generate a packet filter included in the derived QoS rule based on the downlink data packet/flow, and may check whether the same derived QoS rule as the newly generated derived QoS rule has been previously stored using the generated packet filter (e.g., by comparing the packet filter with another derived QoS rule). If the same derived QoS rule has been previously stored, the UE may reset the timer corresponding to/associated with the corresponding derived QoS rule and apply the reflective QoS using the corresponding derived QoS rule. If the same derived QoS rule has not been previously stored, the UE may apply the reflective QoS using the newly generated derived QoS rule and start the received timer.

6. The UE may filter/distinguish the subject on which the QoS marking will be performed by applying the derived QoS rule to the uplink data packets/flows, and may transmit the filtered/distinguished uplink data packets/flows after performing the QoS marking on the filtered/distinguished uplink data packets/flows. In this case, a QFI used to perform the QoS marking on the uplink data packet/flow may have been included in the derived QoS rule, and may be the same as a QFI QoS-marked to a downlink data packet/flow.

7. Thereafter, when the timer expires, the UE and the UP function may delete all of rules (e.g., the DL QoS rule, the UL QoS rule and/or the derived QoS rule) that have been generated or are being stored.

8. Thereafter, a flow corresponding to previously used reflective QoS may reach the UP function.

9. Signaling for reflective QoS, such as that of step 3, may be transmitted/received through the flow detection process of previous step 2.

10-11. While reflective QoS is valid, the UE and/or the UP function may operate based on reflective QoS according to the present embodiment.

In an embodiment of the method 2, the UP function may be restricted as including the timer and reflective QoS indication in the NG3 header and transmitting the NG3 header only when the first downlink data (to which reflective QoS is applied) is transmitted. Accordingly, although the UP function does not separately provide reflective QoS indication with respect to subsequently generated/transmitted downlink data, the UE may consider that the reflective QoS continues to be applied (to a received downlink packet) before the timer expires.

If the UP function transmits the reflective QoS indication and the timer to the UE again before the timer expires, the UE may reset the time that operates based on the reflective QoS indication and newly start the timer. Through such a method, the UP function may increase the time when reflective QoS is used/applied.

In another embodiment of the method 2, there may be a method for the UP function to include reflective QoS indication whenever it transmits downlink data in step 4 without using the timer. That is, the UE may generate a reflective QoS rule (a derived QoS rule in the case of the present embodiment) whenever it receives reflective QoS indication, and may perform QoS marking on uplink data. In this case, if the UE does not receive downlink data on which the reflective QoS indication is marked during a specific time, the timer expires, and the UE may delete/remove a corresponding rule.

In the case of the method 2, there is a problem in that the size of a header is increased if a timer value is great because QoS marking information and timer information must be included in the header of a data packet, but there is an effect in that reflective QoS can be applied even without the generation of additional (control) signaling.

In both the methods 1 and 2, if it is difficult to directly transmit timer information, the number of bits of a timer value can be reduced through a method of previously determining candidate timers to be used in the process of producing a PDU session and transmitting the index of a specific timer selected from the candidate timers. Specifically, if this method is applied to the method 2, a problem in that the size of a header increases as a timer value increases can be solved. Table 2 below illustrates timer values for reflective QoS which are exchanged in a PDU session (setup) process.

TABLE 2

| Timer index | Timer value |
|---|---|
| 1 | T_1 (e.g., 1 min) |
| 2 | T_2 (e.g., 10 min) |
| 3 | T_3 (e.g., 1 hour) |
| . | . |
| . | . |
| . | . |
| N | T_N (e.g., 1 day) |

Alternatively, in the process of producing the PDU session, timer information to be used for reflective QoS may be previously negotiated, and the reflective QoS may be applied without the signaling/exchange of additional timer information. In this case, the timer information is not separately transmitted, but a different value may not be used for each rule (e.g., a derived QoS rule). In order to supplement this problem, if a network node wants to use a timer value different from a timer value determined while producing a PDU session, a method used in the method 1/2 may be used. That is, in the method 1/2, if timer information for reflective QoS is not transmitted, a UE may use a timer value determined/negotiated in the process of producing a PDU session. If timer information for reflective QoS is also transmitted, a UE may use a timer value indicated by the received timer information.

The method 2 may be summarized as follows.

Reflective QoS may be controlled for each packet using an RQI within the encapsulation header of the N3 reference point along with a QFI and reflective QoS timer (RQ timer) value. In this case, the reflective QoS timer value may be signaled to the UE or may be set as a default value when the PDU session is established.

If the RQI is received by the (R)AN in a DL packet on the N3 reference point, the (R)AN may indicate that the QFI and corresponding DL packet are subjected to reflective QoS (i.e., a packet to which the reflective QoS is applied) with respect to the UE.

If the UE receives a DL packet subjected to reflective QoS:

If a derived QoS rule having a packet filter corresponding to a DL packet is not present (i.e., if the same derived QoS rule has not been previously stored), the UE may generate a new derived QoS rule having a packet filter corresponding to a DL packet, and start a timer (set to a RQ time value) for the newly generated derived QoS rule.

Otherwise (i.e., if the same derived QoS rule has not been previously stored), the UE may restart a timer associated with a derived QoS rule that has been previously stored.

When the timer associated with the derived QoS rule expires, the UE may delete the corresponding derived QoS rule.

In some embodiments, reflective QoS to which the timer has been applied may be controlled by the user plane or control plane as follows.

If reflective QoS is controlled by the user plane:

The reflective QoS may be controlled by the user plane for each packet using an RQI within an encapsulation header within the N3 reference point along with a QFI and a reflective QoS timer (RQ timer). In this case, the RQ timer corresponds to the above timer, and may be set as a default value or be signaled for the UE when a PDU session is established.

If 5GC determines to control reflective QoS through the user plane for a specific SDF, the SMF may include indication in corresponding SDF information provided to the UPF through the N4 interface. With respect to a DL packet corresponding to the SDF, the UPF may set RQI bits within an encapsulation header on the N3 reference point.

If a DL packet related to reflective QoS is received, the UE may generate a UE-derived QoS rule (i.e., a "derived QoS rule") and may set the timer as an RQ time value. If a UE-derived QoS rule having the same packet filter is already present, the UE may restart a timer corresponding to the corresponding UE-derived QoS rule. Reflective QoS activation through the user plane may be used to avoid out-of-band signaling (e.g., signaling over a non-3GPP access network).

If reflective QoS is controlled by the control plane:

The reflective QoS may be controlled by the control plane for each QoS flow. When the QoS flow is established, the UE may be provided with a reflective QoS timer (RQ timer) specified for the QoS flow.

If 5GC determines to control reflective QoS through the control plane, the SMF may include RQA in a QoS flow parameter transmitted to the UE through the N1 interface.

When the UE receives a DL packet through a QoS flow in which the RQA has been set as the RQI, the UE may generate a UE-derived QoS rule and start a timer set as an RQ time value. If a UE-derived QoS rule having the same packet filter is already present, the UE may restart a timer corresponding to the corresponding UE-derived QoS rule.

When the timer associated with the UE-derived QoS rule expires, the UE may delete/remove the corresponding UE-derived QoS rule.

The method 2 may have a problem in that reflective QoS-related information is also lost if a packet is lost in a data congestion situation because the reflective QoS-related information is transmitted along with data. Specifically, if the UPF transmits reflective QoS-related information only when it transmits the first downlink data, the UPF does not transmit additional reflective QoS-related information until a timer expires. Accordingly, mismatching between the UPF and the UE is generated with respect to reflective QoS execution.

Accordingly, a procedure for recovering lost reflective QoS-related information is proposed below.

Figure 18:
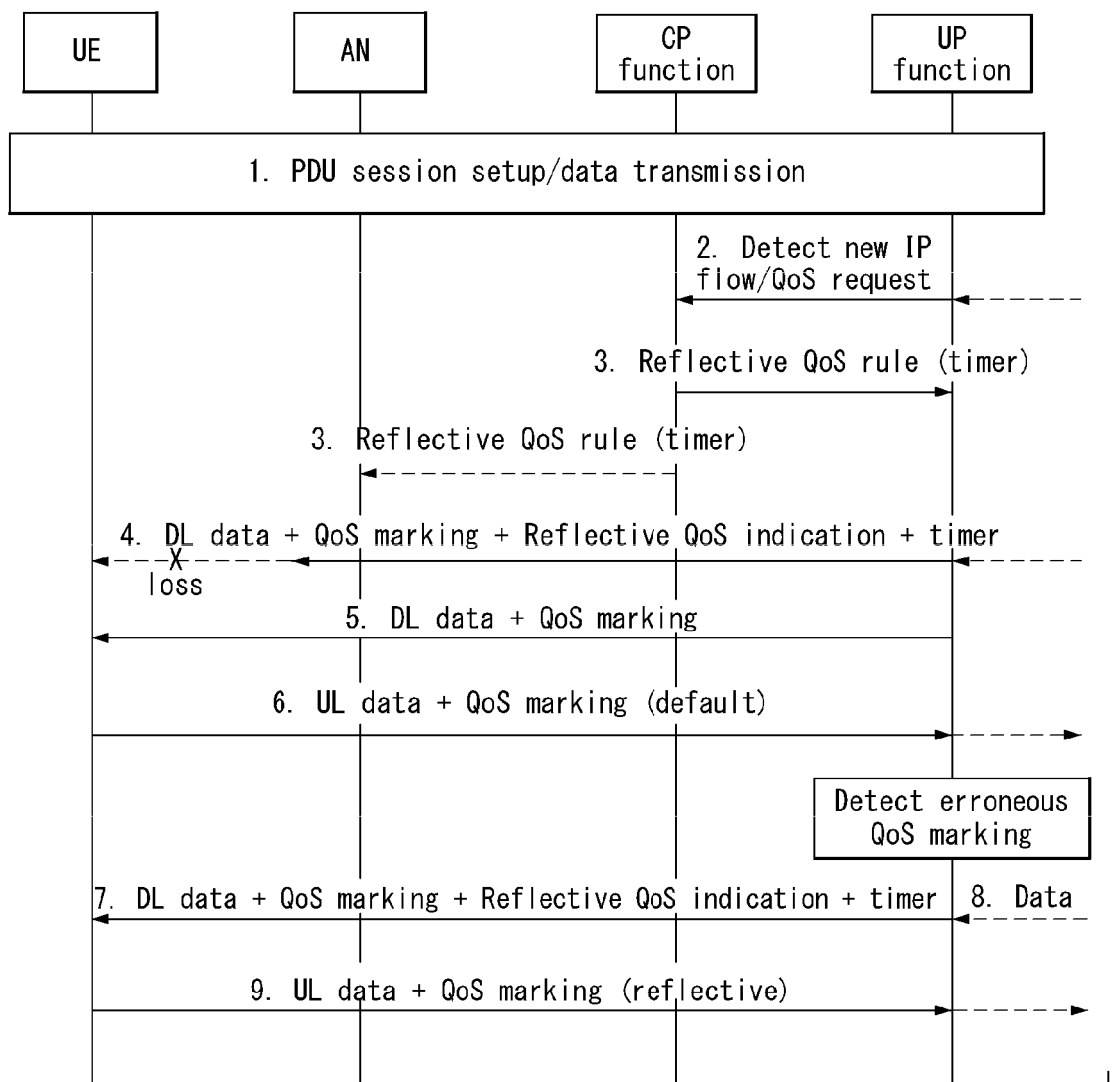
FIG. 18 is a flowchart illustrating a method of recovering reflective QoS-related information if the reflective QoS-related information is lost while the method 2 is applied.

FIG. 18 is a flowchart illustrating a method of recovering reflective QoS-related information if the reflective QoS-related information is lost while the method 2 is applied. In relation to this flowchart, the description of the flowchart of FIG. 17 may be applied identically/similarly, and a redundant description thereof is omitted. Specifically, steps 1 to 3 in this flowchart are the same as steps 1 to 3 of FIG. 17, and a redundant description thereof is omitted.

4. The UP function has included the reflective QoS indication and the timer in the NG3 header and transmitted the data, but the data may be lost due to data congestion within the AN. Thereafter, the UP function may determine that all of pieces of reflective QoS-related information (e.g., QoS marking (e.g., QFI), reflective QoS indication (e.g., RQI) and/or the timer) have been successfully transmitted, and may transmit data except the reflective QoS-related information.

5-6. The UE does not receive indication for reflective QoS and may not generate/apply a derived QoS rule. Instead, the UE may perform default QoS marking (apply a default QoS rule) on uplink data mapped to received downlink data, and may transmit the uplink data. The UP function may detect the QoS marking of the uplink data received from the UE, and may recognize that the QoS marking is not matched with its own reflective QoS (i.e., QoS marking). The UP function notifies the CP function of this mismatching. The CP function may recognize that it has indicated reflective QoS in the UE based on its own QoS rule, and may instruct the UP function to indicate the reflective QoS again with respect to the UE.

7. The UP function may transmit reflective QoS-related information along with corresponding downlink data in response to a command from the CP function when downlink data mapped to reflective QoS (i.e., to which the reflective QoS is applied) is generated. In this case, the UP function may transmit the remaining time of the timer started upon timer transmission in step 4 to the UE or may reset the timer received from the CP function, may start the timer again, and may transmit it to the UE.

8. The UE may receive the reflective QoS-related information, may generate a reflective QoS rule (i.e., a derived QoS rule), and may transmit uplink data (subjected to QoS marking) by applying the reflective QoS rule.

Uplink traffic may be a lot generated, but downlink traffic may be relatively rarely generated depending on the characteristics of an application. In this case, if reflective QoS is activated through inband signaling (a method of providing reflective QoS indication through packet marking), a situation in which a reflective QoS timer is not extended/reset may occur because there is no transmitted downlink packet if reflective QoS is applied based on the timer. That is, since uplink packets continue to be generated, a network wants to continue to use a corresponding derived QoS rule, but cannot extend the time during which a reflective QoS rule is used unless a downlink packet is generated until a previously set timer value expires.

In this case, the network may transmit (indicate) an explicit QoS rule or may transmit a reflective QoS rule (or reflective QoS-related information) with respect to the UE through control plane signaling. Furthermore, in order to stop a reflective QoS application, the network may reset or omit packet marking and transmit it. If a downlink packet that may be transmitted is not present, however, the network cannot perform such an operation. Even in this case, the network may delete/remove a reflective QoS rule (or derived QoS rule) through control plane signaling.

In summary, in a reflective QoS indication operation, if a network does not use inband signaling, this problem may be supplemented through control plane signaling (e.g., the method 1). In other words, upon reflective QoS execution, the network may optionally (complementarily) apply the inband signaling method or the control plane signaling method according to a situation.

A new QoS framework for reflective QoS is hereinafter proposed.

A new wireless communication system (e.g., 5G) supports reflective QoS through an RAN under network control. The network may determine QoS to be applied to DL traffic, and a UE may reflect UL traffic associated with the DL QoS. When the UE receives a DL packet to which reflective QoS must be applied, the UE may generate a new implicit QoS rule (alternatively a derived QoS rule) based on the DL packet. The packet filter of the implicit QoS rule may be derived from the header of the DL packet.

Reflective QoS indication may be signaled through the C-plane (i.e., control signaling) (method 1) or may be signaled through inband (method 2) or may be never signaled (method 3).

If control signaling is used, it does not comply with the object/principle of reflective QoS to minimize signaling and may increase signaling. Inband signaling may be a better solution to reflective QoS because it does not introduce new signaling. In the case of the last option (i.e., if signaling is not used), if a downlink flow is present, it means that reflective QoS is used in a downlink flow and all of corresponding uplink flows. In the case of this option, if an explicit QoS rule is not provided, uplink QoS and downlink QoS may be always the same.

In order to indicate reflective QoS, both the inband signaling method and the non-signaling method may be used. The signaling method may be determined by a network during a PDU session establishment/setup procedure. For example, if a UE is attached through 3GPP access, a network may use inband signaling for reflective QoS.

If the UE is attached through non-3GPP access, the network cannot use any signaling for reflective QoS.

A QoS framework according to a first embodiment may be determined in detail as follows:

1. A new wireless communication system (e.g., 5G) supports reflective QoS through an RAN under network control. The network may determine QoS to be applied to DL traffic, and a UE may reflect the DL QoS in associated UL traffic. When the UE receives a DL packet to which reflective QoS must be applied, it may generate a new implicit QoS rule (e.g., a derived QoS rule) based on the DL packet. The packet filter of the implicit QoS rule may be derived from the header of the DL packet.

Reflective QoS indication may be signaled through inband or may not be signaled in response to an instruction from the network. The indication method may be determined by the network during a PDU session establishment/setup procedure.

2. U-plane marking (i.e., the QoS marking) for QoS may be carried in an encapsulation header on NG3 (without a change of an e2e packet header).

3a. A default QoS rule and a pre-authorized QoS rule may be provided to the UE when a PDU session is established/set up.

3b. The QoS rules may be provided to the RAN when the PDU session is established/set up using NG2 signaling (e.g., depending on an access capability).

4. QoS flow-specific QoS signaling through the C-plane may be necessary for a GBR SDF.

5. For the initialization, change or termination of an SDF not having GBR requirements, QoS-related NG2 signaling corresponding to the pre-authorized QoS rule (other than PDU session establishment/setup) must be minimized.

6. For the initialization, change or termination of an SDF not having GBR requirements, QoS-related NG1 signaling corresponding to the pre-authorized QoS rule (other than PDU session establishment/setup) must be minimized.

7. For a subscription and service distinction, the application of a service data flow and UL rate restriction for each PDU session must be performed in CN_UP.

CN_UP is an execution point reliable by a network and may process all of pieces of traffic in a PDU session.

8. The AN may perform a rate restriction in the UL for each UE.

9. A QoS flow may be the finest granularity for QoS processing in an NG system.

10.1. In the downlink, the (R)AN may bind the QoS flow to access-specific resources based on corresponding QoS characteristics provided through NG3 marking and NG2 signaling. The packet filter is not used for binding between the access-specific resources and the QoS flow in the (R)AN.

10.2. The UE may bind uplink packets to the access-specific resources based on information and/or a (derived) QoS rule (explicitly signaled or implicitly derived by reflective QoS) for binding between the access-specific resources explicitly provided by an access network and the uplink packets.

11. Some user plane marking may be a scalar value having a standardized QoS characteristic.

12. Some user plane marking may be scalar values indicative of dynamic QoS parameters signaled through NG2.

13. The dynamic QoS parameters may include the followings:
 a. Maximum flow bit rate
 b. Guaranteed flow bit rate
 c. Priority level
 d. Packet delay budget
 e. Packet error rate
 f. Admission control Hereinafter, there is proposed a solution for solving the following three issues proposed in relation to reflective QoS.
 Issue 1: whether reflective QoS indication is signaled through the C-plane or inband
 Issue 2: whether a derived QoS rule (i.e., derived through reflective QoS) has higher priority or lower priority than signaled QoS rules
 Issue 3: Whether reflective QoS can be applied to all of access networks connected to the NG core
 <Solution>

1. Reflective QoS Indication Method

A UE does not require an explicit QoS request message for reflective QoS because it drives an uplink QoS rule using the downlink QoS of a corresponding downlink flow. In order to maximize the advantages of reflective QoS, there may be proposed an operation of indicating reflective QoS using the inband signaling method. That is, inband signaling may be used for reflective QoS indication.

2. Valid Period of Derived QoS Rule

The valid period of a derived QoS rule generated through reflective QoS indication needs to be defined. If the derived QoS rule is valid while a PDU session is valid (or during the lifetime of the PDU session), too many derived QoS rules are present in a UE, which may be a burden on the UE. Accordingly, the following two methods may be proposed in order to remove an unnecessary derived QoS rule.

One method is to use explicit signaling and the other method is to use a timer value. If explicit signaling is used, a network may delete/remove a derived QoS rule using the explicit signaling whenever the network wants. However, since there is a problem in that signaling is increased, this specification proposes that the lifetime of a derived QoS rule is restricted using a timer value. Related detailed embodiments have been described above in connection with FIGS. 16 to 18. The timer value may be determined during a PDU session setup/establishment process.

That is, derived QoS through reflective QoS indication may have a valid timer determined during a PDU session setup/establishment procedure.

3. Priority of QoS Rules

If a derived QoS rule has higher priority than a signaled QoS rule, a network cannot apply the signaled QoS rule to the same flow until the timer of the derived QoS rule expires.

However, this is not preferred because the network must be able to update a QoS rule at any time. Accordingly, there may be proposed that a signaled QoS rule has the highest priority and a default QoS rule has the lowest priority. That is, a derived QoS rule through reflective QoS indication may have lower priority than a signaled QoS rule, but may be set to have higher priority than a default QoS rule.

4. Applicability of Reflective QoS to all of Access Networks

There is no reason to use reflective QoS only in a specific access network. Accordingly, reflective QoS may be used in all of access networks.

A QoS framework according to a second embodiment in which the aforementioned solution has been reflected may be determined in detail as follows:

1a. A new wireless communication system (e.g., 5G) supports reflective QoS through the RAN under network control. The network may determine QoS to be applied to DL traffic, and a UE may reflect the DL QoS in associated UL traffic. When the UE receives a DL packet to which reflective QoS must be applied, it may generate a new derived QoS rule based on the DL packet. The packet filter of the derived QoS rule may be derived from the DL packet (i.e., the header of the DL packet). In the case of traffic subjected to reflective QoS, an UL packet may be QoS-processed in the same manner as the reflected DL packet (i.e., having the same QFI or identically QoS-marked).

1b. Inband signaling may be used for reflective QoS indication.

1c. A derived QoS rule through reflective QoS indication may have a valid timer determined during a PDU session setup procedure.

1d. A signaled QoS rule may have the highest priority. The derived QoS rule through reflective QoS indication may have lower priority than the signaled QoS rule, but may have higher priority than a default QoS rule.

1e. Reflective QoS may be used in a non-GBR service data flow.

2. U-plane marking (i.e., the QoS marking) for QoS may be carried in an encapsulation header on NG3 (without a change of an e2e packet header).

3a. A default QoS rule and a pre-authorized QoS rule may be provided to a UE when a PDU session is established/set up. The pre-authorized QoS rule corresponds to all of QoS rules provided when the PDU session is established/set up, and is different from the default QoS rule.

3b. The NAS-level QoS profile of a QoS rule provided in PDU session setup for a UE must be also provided to the RAN using NG2 signaling when a PDU session is configured. The QoS rule may be provided to the NG AN when the PDU session is established/set up using NG2 signaling based on non-3GPP access (e.g., depending on access performance).

3c. A QoS rule may include the QoS profile (A or B type) of an NAS-level, a packet filter and/or a precedence value.

3d. A signaled QoS rule may be provided to a UE connected through the NG RAN based on 3GPP access through NG1 signaling. In this case, it may be assumed that a UE that accesses a NextGen CN through non-3GPP access uses a 3GPP NAS signal.

4. A GBR SDF may be supported in the NextGen system and may require the QoS flow-specific QoS signaling through the C-plane.

5. For the initialization, change or termination of an SDF not having GBR requirements, QoS-related NG2 signaling corresponding to a pre-authorized QoS rule (other than PDU session establishment/setup) must be minimized.

6. For the initialization, change or termination of an SDF not having GBR requirements, QoS-related NG1 signaling corresponding to a pre-authorized QoS rule (other than PDU session establishment/setup) must be minimized.

7a. For a subscription and service distinction, a maximum bit rate restriction of a service data flow (SDF) per UL and DL must be performed in CN_UP, and the CN_UP corresponds to an execution point reliable to a network. Rate restriction execution per PDU session may be applied to a flow that does not require a guaranteed flow bit rate.

7b. In the case of a flow that does not require a guaranteed flow bit rate, a maximum bit rate (MBR) restriction of UL and DL per PDU session may be applied to the CN_UP. In the case of a multi-homed PDU session, a PDU session MBR may be applied to each UPF that terminates the NG6 interface. This may be executed for each UPF. An AMBR for each DN name may not be supported.

8. The AN must execute a maximum bit rate restriction per UE on a flow that does not require a guaranteed flow bit rate in the UL and DL.

9. A QoS flow may be the finest granularity for QoS processing in the NG system. User plane traffic having the same NG3 marking value within a PUD session corresponds to the QoS flow.

10.1.1. In the downlink, the (R)AN may bind the QoS flow to access-specific resources based on corresponding QoS characteristics provided through NG3 marking and NG2 signaling by considering an NG3 tunnel associated with a downlink packet. A packet filter is not used to bind the QoS flows to the access-specific resources in the (R)AN.

10.1.2. When an UL packet passes through from the (R)AN to the CN, the RAN may determine NG3 QoS marking and select an NG3 tunnel based on information received from an access stratum.

10.2.1. In a higher layer, a UE may match the uplink packet to the QoS rule and bind the uplink packet to the NAS-level QoS profile (A- or B-type) of the QoS rule (explicitly signaled or implicitly derived from reflective QoS).

10.2.2. When the UL packet passes through the AS in the higher layer of the UE, the higher layer may indicate the NAS-level QoS profile (through corresponding QoS marking) in the AS by including information that enables the AS to identify a PDU session.

10.2.3. Inversely, when the DL packet passes through from the AS to a proper higher layer instance of the UE, to select a proper higher layer instance corresponding to a PDU session is a responsibility for the AS. The AS may also indicate the NAS-level QoS profile (through corresponding QoS marking) in the higher layer instance.

In the case of 10.2.2. and 10.2.3., there is no precondition for the necessity of U-plane marking from the RAN to the UE.

In order to indicate QoS requested in the 10.2.4. IP packet, in the case of a QoS application using a DSCP, a packet filter including DSCP marking within a QoS rule provided by CN_CP may be used for binding with specific QoS marking.

10.3. If the RAN has determined that flexible mapping (e.g., other than one-to-one) is present between an NAS-level QoS profile and an AS-level QoS, this mapping is transparent to a higher layer and does not have an influence on NG3 marking. It is assumed that an access stratum complies with QoS characteristics associated with the NAS-level QoS profile.

A method of defining the AS-level QoS of a DRB and mapping an uplink and downlink packet (having an associated QoS profile and associated PDU session information) to a DRB depends on the RAN.

11. Some user plane QoS marking is a scalar value having standardized QoS characteristics (referred to as an A-type QoS profile).

12. Some user plane QoS marking is a scalar value indicative of dynamic QoS parameters signaled through NG2 (referred to as a B-type QoS profile).

The QoS marking value indicates the type (A- or B-type) of associated QoS profile.

13. The QoS parameters may include the followings:
   a. Maximum flow bit rate
   b. Guaranteed flow bit rate
   c. Priority level
   d. Packet delay budget
   e. Packet error rate
   f. Admission control The parameters c, d and e are applied to 11. and 12. only, and the parameters a, b and f are applied to 12. only.

14. A QoS framework does not assume the necessity of an NG3 tunnel for each QoS flow.

15. With respect to not-guaranteed bit rate QoS flows corresponding to pre-authorized QoS rules, a UE may transmit UL traffic without specific additional NG1 signaling.

16. UE-triggered QoS establishment for a guaranteed bit rate QoS flow is based on explicit UE-request QoS through NG1.

Hereinafter, there is proposed the deactivation mechanism of a derived QoS rule based on a timer set while a PDU session is established.

There are some candidate solutions for the deactivation of a derived QoS rule.

A first solution is to use implicit deactivation without signaling or a pre-configuration (i.e., this is left as an implementation of a UE and 5G-CN). Accordingly, in the case of this solution, a deactivation process does not need to be separately standardized. However, in order to support uplink QoS verification, a 5G CN and a UE need to have the same QoS rule. Accordingly, implicit deactivation cannot be used because it does not guarantee a QoS rule synchronized between the 5G CN and the UE.

A second solution is to use explicit signaling in order to deactivate a derived QoS rule. If reflective QoS is activated through control plane signaling, this solution may be used. However, if reflective QoS is activated through user plane marking, this solution is inappropriate because to avoid out-of-band signaling is the key point of user plane activation.

A third solution is a method similar to a method supported in the EPS. In the EPS, a UE reflective QoS procedure may be deleted as follows (TS 24.139).

In the EPS, a UE may generate a table when it transmits/receives a corresponding packet and manage an updated time stamp. The time when the entry is maintained depends on a UE implementation.

A similar mechanism may be used in the 5G system. If a network indicates reflective QoS activation, the network may start a timer with a preset value determined during PDU session setup. When a UE receives reflective QoS indication, it may start (or restart/reset) the same timer. When the timer expires, a derived QoS rule may be deactivated.

That is, if an UPF indicates the activation of reflective QoS, the UPF may start a deactivation timer previously set during PDU session setup. Whenever the UPF indicates the reflective QoS, the UPF may reset the timer. If reflective QoS indication is received, the UE may also start the deactivation timer and may reset the timer whenever it receives reflective QoS indication. The derived QoS rule is deactivated when the timer expires.

In addition to the aforementioned methods, other some methods for deactivating reflective QoS may be present. User plane solutions that deactivate reflective QoS by basically not including an RQI or basically including reflective QoS deactivation indication (RQDI) correspond to the some methods. However, if there is no downlink packet associated with reflective QoS, such a mechanism cannot be executed. In order to deactivate the reflective QoS, control plane signaling is required.

In contrast, the deactivation method using a timer proposed by this specification has an advantage in that it does not require additional signaling for deactivating reflective QoS.

Such a concept of this specification is a concept corresponding to the method 2 and may be summarized in brief as follows and may be reflected in TS 23.501.

1. Inactivation of Reflective QoS 1-1. General

5GC supports reflective QoS deactivation. Reflective QoS may be deactivated through the user plane and the control plane. 5GC may determine whether a reflective QoS function will be deactivated through the control plane or deactivated through the user plane based on a policy and access type.

1-2. Reflective QoS Deactivation Through User Plane

In the establishment process of a PDU session, the SMF may notify a UE of a deactivation timer value. If the UPF indicates reflective QoS, the SMF may configure a deactivation timer so that the time starts. The UE may also start the deactivation timer whenever it receives reflective QoS indication. The UPF may reset the (corresponding) timer when it includes an RQI in an encapsulation header on the N3 reference point. The UE may reset the (corresponding) timer whenever it receives reflective QoS indication.

If 5GC has determined to deactivate a reflective QoS function through the U-plane, the SMF may transmit a QoS rule having user plane reflective QoS deactivation indication to the UPF. In this case, if a downlink packet corresponding to the reflective QoS is present, the UPF may stop the indication of an RQI within an encapsulation header. Furthermore, the UE does not reset an associated deactivation timer when it receives a packet not having an RQI. The UE and UPF may remove a derived QoS rule when the deactivation timer expires.

1-3. Reflective QoS Deactivation Through Control Plane

If 5GC has determined to deactivate reflective QoS through the control plane, the SMF may explicitly transmit a deactivation request (e.g., transmits an updated QoS rule or transmits a reflective QoS rule removal command) to the UE and UPF. If the SMF has updated the QoS rule, the UE and UPF may remove a derived QoS rule generated by the updated QoS rule.

Figure 19:
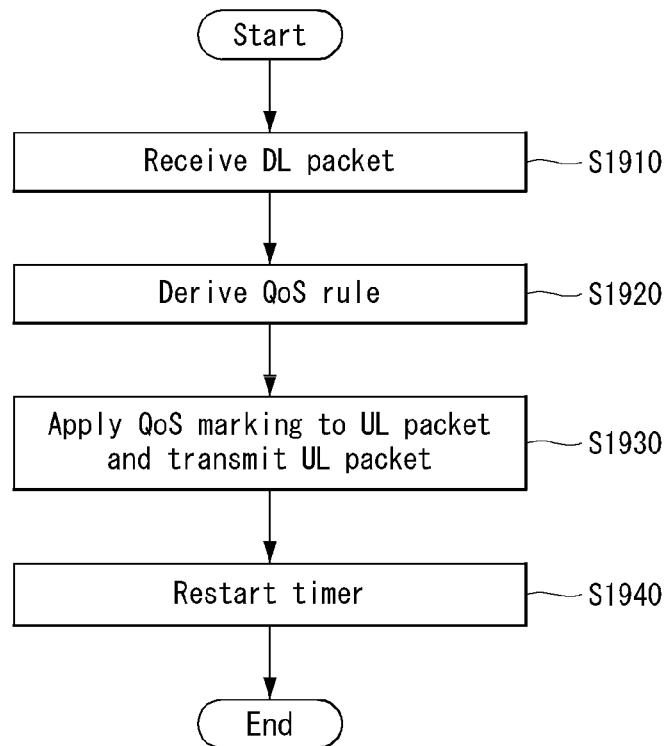
FIG. 19 is a flowchart illustrating a reflective QoS procedure according to an embodiment of the present invention.

FIG. 19 is a flowchart illustrating a reflective QoS procedure according to an embodiment of the present invention. The description described in relation to FIGS. 15 to 18 may be applied to this flowchart identically/similarly, and a redundant description thereof is omitted.

First, a UE may receive a downlink packet from a network (S1910). In this case, the downlink packet may correspond to a packet in which the application of reflective QoS has been indicated. More specifically, the downlink packet may correspond to a packet to which reflective QoS application has been indicated by a reflective QoS indicator. In this case, a network may correspond to the AN that receives reflective QoS indication indicative of the reflective QoS application of the downlink packet and QoS marking through an encapsulation header on the N3 reference point from a user plane function.

Next, the UE may derive a QoS rule based on the downlink packet (S1920). More specifically, the UE may check whether a QoS rule associated with the downlink packet is present. If a QoS rule associated with the downlink packet is not present, the UE may derive a QoS rule based on the downlink packet and start a timer. If a QoS rule associated with the downlink packet is present, the UE may perform steps S1930 and S1940 below.

Next, the UE may transmit an uplink packet to the network by applying the QoS marking of the downlink packet to the uplink packet using the (newly generated or existing) QoS rule (S1930). More specifically, the UE may filter an uplink packet matched with a packet filter included in the QoS rule by evaluating a plurality of uplink packets in order of precedence values. Furthermore, the UE may transmit the filtered uplink packet to the network by applying QoS marking included in the QoS rule to the filtered uplink packet. In this case, applying the QoS marking may mean marking a QFI (or binding with a specific QoS flow). The QoS marking may correspond to the ID of a QoS flow within the downlink packet (or QoS rule).

Next, when the UE receives a downlink packet before a timer associated with the QoS rule expires, it may restart the corresponding timer (S1940). When the UE receives the downlink packet after the timer expires, the UE may newly start the corresponding timer. When the timer expires, the UE deletes the derived QoS rule. The value of the timer may be previously determined in the PDU session establishment procedure of the UE.

The QoS rule may be used to determine a mapping relation between the uplink packet and the QoS flow. The QoS rule may include a packet filter derived from the downlink packet (specifically, the header of the downlink packet), the QoS marking of the downlink packet and a precedence value used to determine the evaluation order of the uplink packet.

The QoS rule derived according to such reflective QoS execution may have lower priority than an explicitly signaled QoS rule. Furthermore, the application of such a reflective QoS may be deactivated through a user plane or a control plane.

General Apparatus to which the Present Invention May be Applied

Figure 20:
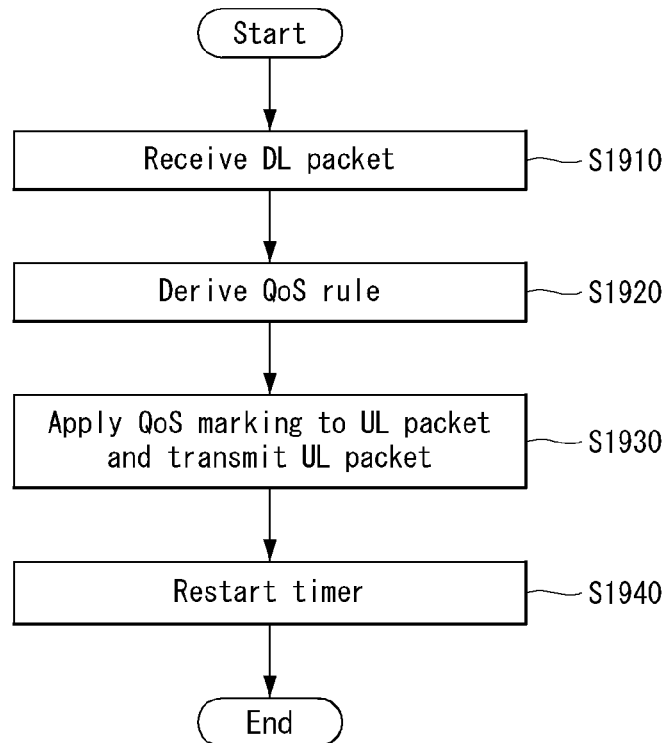
FIG. 20 shows a block diagram of a communication apparatus according to an embodiment of the present invention.

FIG. 20 shows a block diagram of a communication apparatus according to an embodiment of the present invention.

Referring to FIG. 20, a wireless communication system includes a network node 2010 and a plurality of UEs 2020. The apparatus shown in this drawing may be implemented to perform at least one of the aforementioned network/UE functions and may be implemented to integrate and perform one or more of the functions.

The network node 2010 includes a processor 2011, memory 2012, and a communication module 2013.

The processor 2011 implements at least one function, process and/or method proposed in FIGS. 1 to 19 and/or the function, process and/or method proposed in this document. Furthermore, a module, program, etc. that implements the function, process and/or method proposed in this specification may be stored in the memory 2012 and executed by the processor 2011.

The layers of a wired/wireless interface protocol may be implemented by the processor 2011. Furthermore, the processor 2011 may be implemented to independently apply the contents described in the various embodiments proposed in this document or to apply two or more of the embodiments at the same time.

The memory 2012 is connected to the processor 2011 and stores various types of information for driving the processor 2011. The memory 2012 may be located inside or outside the processor 2011 and may be connected to the processor 2011 by well-known various means.

The communication module 2013 is connected to the processor 2011 and transmits and/or receives wired/wireless signals. The network node 2010 may include, for example, an eNB, an MME, an HSS, an SGW, a PGW, an SCEF, an SCS/AS, an AUSF, an AMF, a PCF, an SMF, a UDM, a UPF, an AF, an (R)AN, a UE, an NEF, an NRF, a UDSF and/or an SDSF. Specifically, if the network node 2010 is an eNB (or if it is implemented to perform an (R)AN function), the communication module 2013 may include a radio frequency (RF) unit for transmitting/receiving radio signals. In this case, the network node 2010 may have a single antenna or multiple antennas.

The UE 2020 includes a processor 2021, memory 2022 and a communication module (or RF unit) 2023. The processor 2021 implements at least one function, process and/or method proposed in FIGS. 1 to 19 and/or the function, process and/or method proposed in this document. Furthermore, a module, program, etc. that implements the function, process and/or method proposed in this specification may be stored in the memory and executed by the processor 2021.

The layers of a wired/wireless interface protocol may be implemented by the processor 2021. Furthermore, the processor 2021 may be implemented to independently apply the contents described in the various embodiments proposed in this document or to apply two or more of the embodiments at the same time.

The memory 2022 is connected to the processor 2021 and stores various types of information for driving the processor 2021. The memory 2022 may be located inside or outside the processor 2021 and may be connected to the processor 2021 by well-known various means The memory 2012, 2022 may be located inside or outside the processor 2011, 2021 and may be connected to the processor 2011, 2021 by well-known various means. Furthermore, the network node 2010 (if it is an eNB) and/or the UE 2020 may have a single antenna or multiple antennas.

Figure 21:
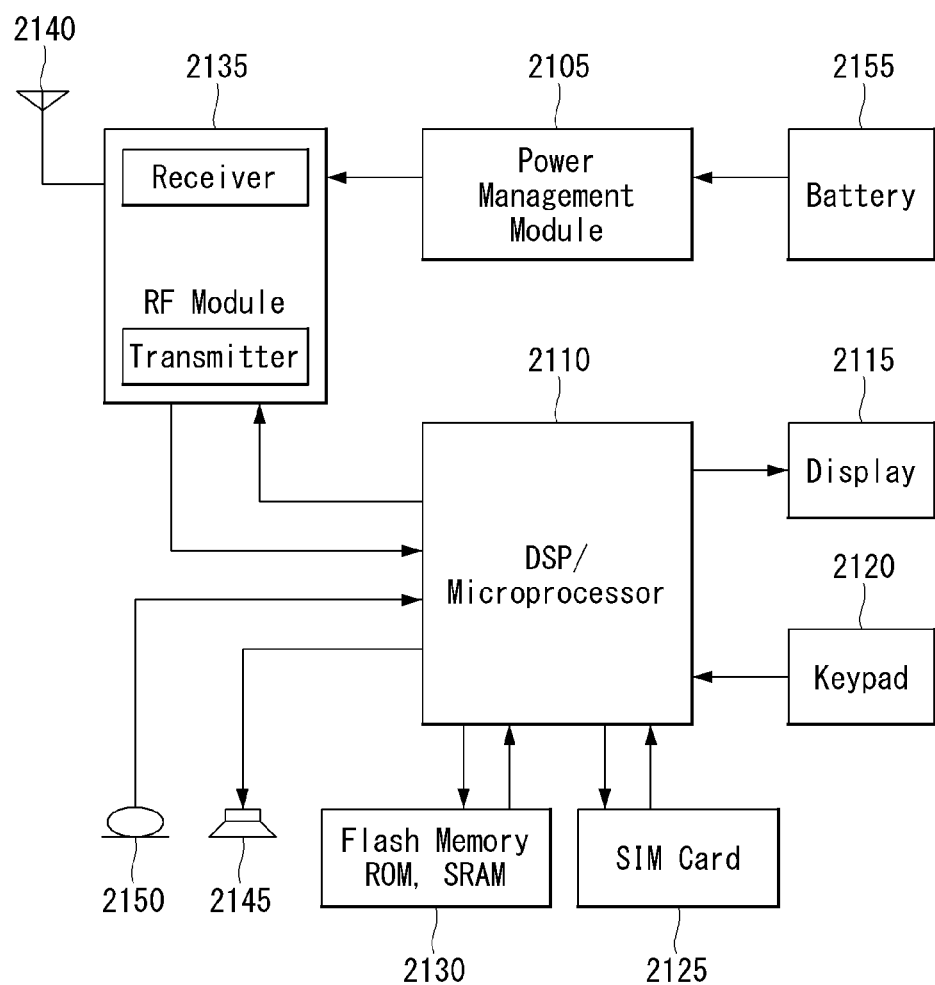
FIG. 21 shows a block diagram of a communication apparatus according to an embodiment of the present invention.

FIG. 21 shows a block diagram of a communication apparatus according to an embodiment of the present invention.

Specifically, FIG. 21 is a more detailed diagram of the UE of FIG. 20.

Referring to FIG. 21, the UE may include a processor (or digital signal processor (DSP)) 2110, an RF module (or RF unit) 2135, a power management module 2105, an antenna 2140, a battery 2155, a display 2115, a keypad 2120, memory 2130, a subscriber identification module (SIM) card 2125 (this element is optional), a speaker 2145 and a microphone 2150. The UE may also include a single antenna or multiple antennas.

The processor 2110 implements the functions, processes and/or methods proposed in FIGS. 1 to 20. The layers of a radio interface protocol may be implemented by the processor 2110.

The memory 2130 is connected to the processor 2110 and stores information related to the operation of the processor 2110. The memory 2130 may be located inside or outside the processor 2110 and may be connected to the processor 2110 by well-known various means.

A user inputs command information, such as a telephone number, by pressing (or touching) a button of the keypad 2120 or by voice activation using the microphone 2150, for example. The processor 2110 processes a proper function, such as receiving such command information or making a call to a telephone number, so that the function is performed. Operational data may be extracted from the SIM card 2125 or the memory 2130. Furthermore, the processor 2110 may display command information or driving information on the display 2115 so that a user can recognize the information or for convenience.

The RF module 2135 is connected to the processor 2110 and transmits and/or receives RF signals. The processor 2110 transfers command information to the RF module 2135 so that a radio signal forming voice communication data, for example, is transmitted in order to initiate communication. The RF module 2135 includes a receiver and a transmitter in order to transmit and receive radio signals. The antenna 2140 functions to transmit and receive radio signals. When the RF module 2135 receives a radio signal, it transfers the signal for the processing of the processor 2110 and may convert the signal into a baseband. The processed signal may be converted into audible or readable information through the speaker 2145.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The present invention has been described based on an example in which it has been applied to the 3GPP LTE/LTE-A/5G (NextGen) systems, but may be applied to various wireless communication systems in addition to the 3GPP LTE/LTE-A/5G (NextGen) systems.

The invention claimed is:

1. A method for a user equipment (UE) to perform reflective quality of service (QoS) in a wireless communication system, the method comprising steps of:
   receiving a downlink packet from a network, wherein the downlink packet is a packet to which an application of the reflective QoS is indicated;
   deriving a QoS rule based on the downlink packet;
   applying a QoS marking of the downlink packet to an uplink packet using the QoS rule and transmitting the uplink packet to the network; and
   restarting a timer associated with the QoS rule when the downlink packet is received before the timer expires.

2. The method of claim 1, further comprising a step of deleting the QoS rule when the timer expires.

3. The method of claim 2, further comprising a step of starting the timer when the downlink packet is received after the timer expires.

4. The method of claim 2, wherein a value of the timer is previously determined in a protocol data unit (PDU) session establishment procedure of the UE.

5. The method of claim 2, wherein, when the network is an access network (AN), the AN is a network node receiving reflective QoS indication indicative of the reflective QoS application of the downlink packet and the QoS marking through an encapsulation header on an N3 reference point from a user plane function.

6. The method of claim 2, wherein the QoS marking corresponds to an identifier of a QoS flow of the downlink packet.

7. The method of claim 6, wherein the QoS rule is used to determine a mapping relation between the uplink packet and the QoS flow.

8. The method of claim 7, wherein the QoS rule comprises a packet filter derived from the downlink packet, the QoS marking of the downlink packet, and a precedence value used to determine an evaluation order of the uplink packet.

9. The method of claim 8, wherein the packet filter is derived from a header of the downlink packet.

10. The method of claim 8, wherein the step of applying the QoS marking of the downlink packet to the uplink packet using the QoS rule and transmitting the uplink packet to the network comprises steps of:
    filtering an uplink packet matched with the packet filter included in the QoS rule by evaluating a plurality of uplink packets in the order of the precedence value; and
    applying the QoS marking included in the QoS rule to the filtered uplink packet and transmitting the filtered uplink packet to the network.

11. The method of claim 2, wherein the step of deriving the QoS rule based on the downlink packet comprises steps of:
    checking whether the QoS rule associated with the downlink packet is present; and deriving the QoS rule based on the downlink packet if the QoS rule associated with the downlink packet is not present and starting the timer.

12. The method of claim 2, wherein the QoS rule derived according to the reflective QoS application has lower priority than an explicitly signaled QoS rule.

13. The method of claim 2, wherein the application of the reflective QoS is deactivated through a user plane or a control plane.

14. A user equipment (UE) for performing reflective quality of service (QoS) in a wireless communication system, the UE comprising:
   a communication module configured to transmit/receive a signal; and
   a processor configured to control the communication module,
   wherein the processor is further configured to:
   receive a downlink packet from a network, the downlink packet being a packet to which an application of the reflective QoS is indicated,
   derive a QoS rule based on the downlink packet,
   apply a QoS marking of the downlink packet to an uplink packet using the QoS rule and transmit the uplink packet to the network, and
   restart a timer associated with the QoS rule when the downlink packet is received before the timer expires.

15. The UE of claim 14, wherein the processor is further configured to delete the QoS rule when the timer expires.

* * * * *